(12) United States Patent
Shah et al.

(10) Patent No.: US 11,964,465 B2
(45) Date of Patent: Apr. 23, 2024

(54) BIAXIALLY-STRETCHABLE BARRIER LAMINATE FABRIC COMPOSITE MATERIAL AND METHOD OF MANUFACTURE

(71) Applicant: LaunchBay LLC, North Billerica, MA (US)

(72) Inventors: Apoorva P Shah, Burlington, MA (US); Binod Giri, Tewksbury, MA (US); Arjan Giaya, Shrewsbury, MA (US)

(73) Assignee: LaunchBay LLC, North Billerica, MA (US)

( * ) Notice: Subject to any disclaimer, the term of this patent is extended or adjusted under 35 U.S.C. 154(b) by 0 days.

(21) Appl. No.: 18/056,441

(22) Filed: Nov. 17, 2022

(65) Prior Publication Data
US 2023/0150240 A1     May 18, 2023

Related U.S. Application Data

(60) Provisional application No. 63/264,267, filed on Nov. 18, 2021.

(51) Int. Cl.
| | |
|---|---|
| *B32B 7/14* | (2006.01) |
| *B32B 27/12* | (2006.01) |
| *B32B 27/30* | (2006.01) |
| *B32B 27/40* | (2006.01) |
| *B32B 37/00* | (2006.01) |
| *B32B 37/20* | (2006.01) |
| *B32B 38/00* | (2006.01) |

(52) U.S. Cl.
CPC ............ *B32B 7/14* (2013.01); *B32B 27/12* (2013.01); *B32B 27/306* (2013.01); *B32B 27/40* (2013.01); *B32B 37/0076* (2013.01); *B32B 37/203* (2013.01); *B32B 38/1875* (2013.01); *B32B 2038/0076* (2013.01); *B32B 2250/04* (2013.01); *B32B 2305/18* (2013.01); *B32B 2329/04* (2013.01); *B32B 2375/00* (2013.01)

(58) Field of Classification Search
CPC ......... B32B 7/14; B32B 27/12; B32B 27/306; B32B 27/40; B32B 2250/04; B32B 2305/18; B32B 2329/04; B32B 2375/00
USPC ........................................................ 428/198
See application file for complete search history.

(56) References Cited

U.S. PATENT DOCUMENTS

| | | | |
|---|---|---|---|
| 4,298,643 A * | 11/1981 | Miyagawa | ............ B32B 5/024 264/257 |
| 4,935,287 A | 6/1990 | Johnson et al. | |
| 5,529,830 A | 6/1996 | Dutta et al. | |
| 8,037,550 B2 | 10/2011 | Jain | |
| 9,234,121 B2 | 1/2016 | Kelsey | |
| 9,238,344 B2 | 1/2016 | Kelsey et al. | |

(Continued)

*Primary Examiner* — Betelhem Shewareged
(74) *Attorney, Agent, or Firm* — Intrinsic Law Corp.

(57) ABSTRACT

A biaxially stretchable laminated fabric composite material includes a four-way stretchable fabric and a barrier film. The barrier film and the fabric are selectively attached at a plurality of individual bond points. When the fabric is in an unstretched state, random folds are formed in the unbonded regions of the barrier film. When the fabric is in a stretched state, the random folds are partially or fully flattened to allow the biaxially stretchable laminated fabric composite material to biaxially stretch.

10 Claims, 27 Drawing Sheets

(56) References Cited

U.S. PATENT DOCUMENTS

| | | | |
|---|---|---|---|
| 2002/0001683 A1* | 1/2002 | Dutton | B32B 5/02 |
| | | | 428/35.1 |
| 2002/0119288 A1* | 8/2002 | Morman | B32B 5/022 |
| | | | 428/152 |
| 2004/0102125 A1* | 5/2004 | Morman | A61F 13/4902 |
| | | | 442/195 |
| 2023/0150240 A1* | 5/2023 | Shah | B32B 7/12 |
| | | | 428/198 |

* cited by examiner

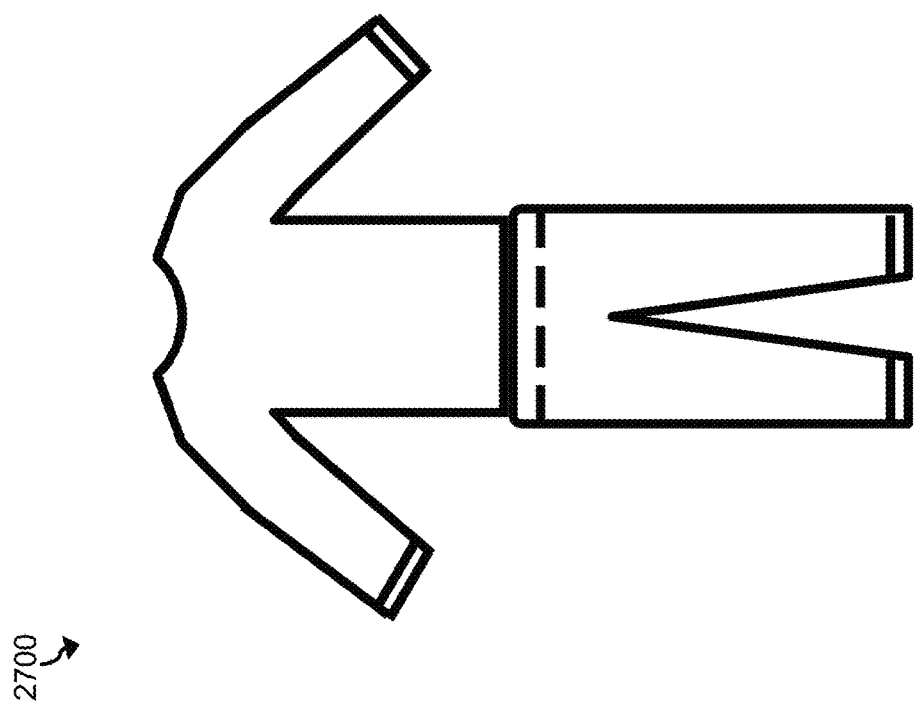

BIAXIALLY-STRETCHABLE BARRIER LAMINATE FABRIC COMPOSITE MATERIAL AND METHOD OF MANUFACTURE

CROSS-REFERENCE TO RELATED APPLICATIONS

This application claims priority to U.S. Provisional Application No. 63/264,267, titled "Biaxially-Stretchable Barrier Laminate Fabric and Method of Manufacture," filed on Nov. 18, 2021, which is hereby incorporated by reference.

STATEMENT REGARDING FEDERALLY SPONSORED RESEARCH

This invention was made with government support under Contract No. W911QY20C0022 awarded by the Defense Threat Reduction Agency (DTRA). The government has certain rights in the invention.

TECHNICAL FIELD

This application relates generally to personal protective clothing and equipment.

BACKGROUND

Chemical, biological, radioactive and nuclear (CBRN) protective ensembles are widely used by military and civilian first responders as the first line of defense for protecting personnel working in contaminated environments. Commercial ensembles, such as Tychem® (Dupont Corp.), Trellchem® (Ansell Ltd.), or Onesuit® (Saint Gobain Performance Plastics), are typically constructed using a protective fabric that prevents permeation and breakthrough of toxic chemicals. The main mode of action is to present a physical barrier between the wearer and the toxic environment. This is achieved by constructing the garment using a protective fabric consisting of a base textile material either impregnated with or laminated to a barrier polymer layer.

Since most polymers that are good barriers to chemical permeation are usually stiff with low elongation levels, currently-available CBRN ensembles are bulky, preventing the user from unrestricted and agile movement.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a method for forming a biaxially stretchable barrier laminate fabric composite material, comprising: biaxially stretching a substrate fabric from a substrate relaxed state to a biaxially-stretched state; forming individual bond points between a barrier film and the substrate fabric while the substrate fabric is in the biaxially-stretched state and the barrier film is in a flat state to form a laminated fabric composite material; and after forming the bond points: biaxially relaxing the substrate fabric from the biaxially-stretched state to the substrate relaxed state; and while the substrate fabric is biaxially relaxed, forming random folds in the barrier film between the bond points.

In one or more embodiments, the step of forming the bond points between the barrier film and the substrate fabric comprises: selectively applying an adhesive to the substrate fabric and/or to the barrier film; after selectively applying the adhesive to the substrate fabric and/or to the barrier film, physically contacting the substrate fabric and the barrier film such that the adhesive is between the substrate fabric and the barrier film; and curing the adhesive. In one or more embodiments, the step of selectively applying the adhesive to the substrate fabric and/or to the barrier film comprises applying adhesive dots to the substrate fabric and/or to the barrier film. In one or more embodiments, each adhesive dot has a respective adhesive dot size of about 0.1 to about 2 microliters. In one or more embodiments, the method further comprises applying the adhesive dots in a regular grid pattern, wherein a straight-line distance between neighboring adhesive dots is greater than or equal to about 0.1 inches and less than or equal to about 2 inches, the straight-line distance measured while the substrate fabric is in the biaxially-stretched state.

In one or more embodiments, the step of forming the bond points between the barrier film and the substrate fabric comprises: physically contacting the substrate fabric and the barrier film; and while physically contacting the substrate fabric and the barrier film, selectively applying radio-frequency, ultrasound, and/or heat energy to the substrate fabric and the barrier film to form the bond points. In one or more embodiments, the substrate fabric is a first substrate fabric, the bond points are first bond points, the substrate relaxed state is a first-substrate relaxed state, the biaxially-stretched state is a first biaxially-stretched state, and the method further comprises: biaxially stretching a second substrate fabric from a second-substrate relaxed state to a second biaxially-stretched state; after forming the first bond points between the barrier film and the first substrate fabric, forming second bond points between the barrier film and the second substrate fabric while the second substrate fabric is in the second biaxially-stretched state to form the laminated fabric composite material; and after forming the second bond points: biaxially relaxing the first substrate fabric from the first biaxially-stretched state to the first-substrate relaxed state; and biaxially relaxing the second substrate fabric from the second biaxially-stretched state to the second-substrate relaxed state; and forming the random folds in the barrier film between the first and second bond points. In one or more embodiments, the method further comprises aligning the first and second bond points with respect to each other.

Another aspect of the invention is directed to a method for forming a biaxially-stretchable barrier laminate fabric composite material, comprising: forming individually bond points between a barrier film and a substrate fabric while the substrate fabric is in a relaxed state and the barrier film is in a flat state to form a laminated fabric composite material; biaxially stretching the laminated fabric composite material to cause a strain on the barrier film that is greater than a yield strain of the barrier film to permanently increase biaxial dimensions of the barrier film; biaxially relaxing the laminated fabric composite material from a biaxially-strained state to a barrier-film relaxed state; and while the laminated fabric composite material transitions from the biaxially-strained state to the barrier-film relaxed state, forming random folds in the barrier film between the bond points.

Another aspect of the invention is directed to a method for forming a stretchable barrier laminate fabric composite material, comprising: biaxially stretching a substrate fabric by a first percentage from a substrate relaxed state to a substrate biaxially-stretched state; forming individual bond points between a barrier film and the substrate fabric while the substrate fabric is in the biaxially-stretched state and the barrier film is in a flat state to form a laminated fabric composite material, the laminated fabric composite material in a first biaxially-stretched state; after forming the bond points between the barrier film and the substrate fabric, biaxially stretching the laminated fabric composite material by a second percentage to transition the laminated fabric composite material to a second biaxially-stretched state, the second percentage determined with respect to the first biaxially-stretched state; after biaxially stretching the laminated fabric composite material by the second percentage: biaxially relaxing the laminated fabric composite material from the second biaxially-stretched state to the first biaxially-stretched state; and biaxially relaxing the substrate fabric from the substrate biaxially-stretched state back to the substrate relaxed state; and while the substrate fabric is biaxially relaxed, forming random folds in the barrier film between the bond points.

In one or more embodiments, biaxially stretching the laminated fabric composite material by the second percentage causes a strain on the barrier film that is greater than a yield strain of the barrier film.

Another aspect of the invention is directed to a biaxially-stretchable barrier laminate fabric composite material comprising: a biaxially-stretchable substrate fabric having a relaxed state and a biaxially-stretched state, wherein dimensions of the biaxially-stretchable substrate fabric are greater in the biaxially-stretched state than in the relaxed state; a barrier film selectively attached to the biaxially-stretchable substrate fabric at a plurality of individual bond points, the barrier film having unbonded regions between the bond points, wherein the biaxially stretchable barrier laminate fabric is configured such that: when the biaxially-stretchable substrate fabric is in the relaxed state, the barrier film is in a randomly folded state in which random folds are formed in the unbonded regions of the barrier film, the random folds oriented with respect to a machine direction, a cross direction, and an orthogonal direction, wherein the machine direction, the cross direction and the orthogonal direction are mutually orthogonal to one another, and when the biaxially-stretchable substrate fabric is in the biaxially-stretched state, the barrier film is in a flat state in which the random folds are partially or fully unfolded.

In one or more embodiments, the biaxially-stretchable substrate fabric is capable of stretching biaxially without substantially stretching the barrier film. In one or more embodiments, the barrier film comprises: first and second outer flexible layers; and a central barrier layer between the first and second outer flexible layers. In one or more embodiments, the central barrier layer comprises an ethylene vinyl alcohol polymer. In one or more embodiments, the first and second outer flexible layers comprise a thermoplastic polyurethane.

In one or more embodiments, the bond points comprise adhesive dots. In one or more embodiments, a straight-line distance between neighboring bond points is greater than or equal to about 0.1 inches and less than or equal to about 2 inches, the straight-line distance measured while the substrate fabric is in the biaxially-stretched state. In one or more embodiments, the barrier film is configured to reversibly biaxially stretch within a barrier film elastic region when the biaxially-stretchable substrate fabric is in the biaxially-stretched state. In one or more embodiments, the material is configured to reversibly biaxially stretch and relax for at least 2,000 cycles. In one or more embodiments, the barrier layer functions as a chemical barrier regardless of whether the barrier layer is in the randomly folded state or the flat state.

BRIEF DESCRIPTION OF THE DRAWINGS

For a fuller understanding of the nature and advantages of the concepts disclosed herein, reference is made to the detailed description of preferred embodiments and the accompanying drawings.

FIG. 27 illustrates CRBN garments according to an embodiment

DETAILED DESCRIPTION

Figure 1:
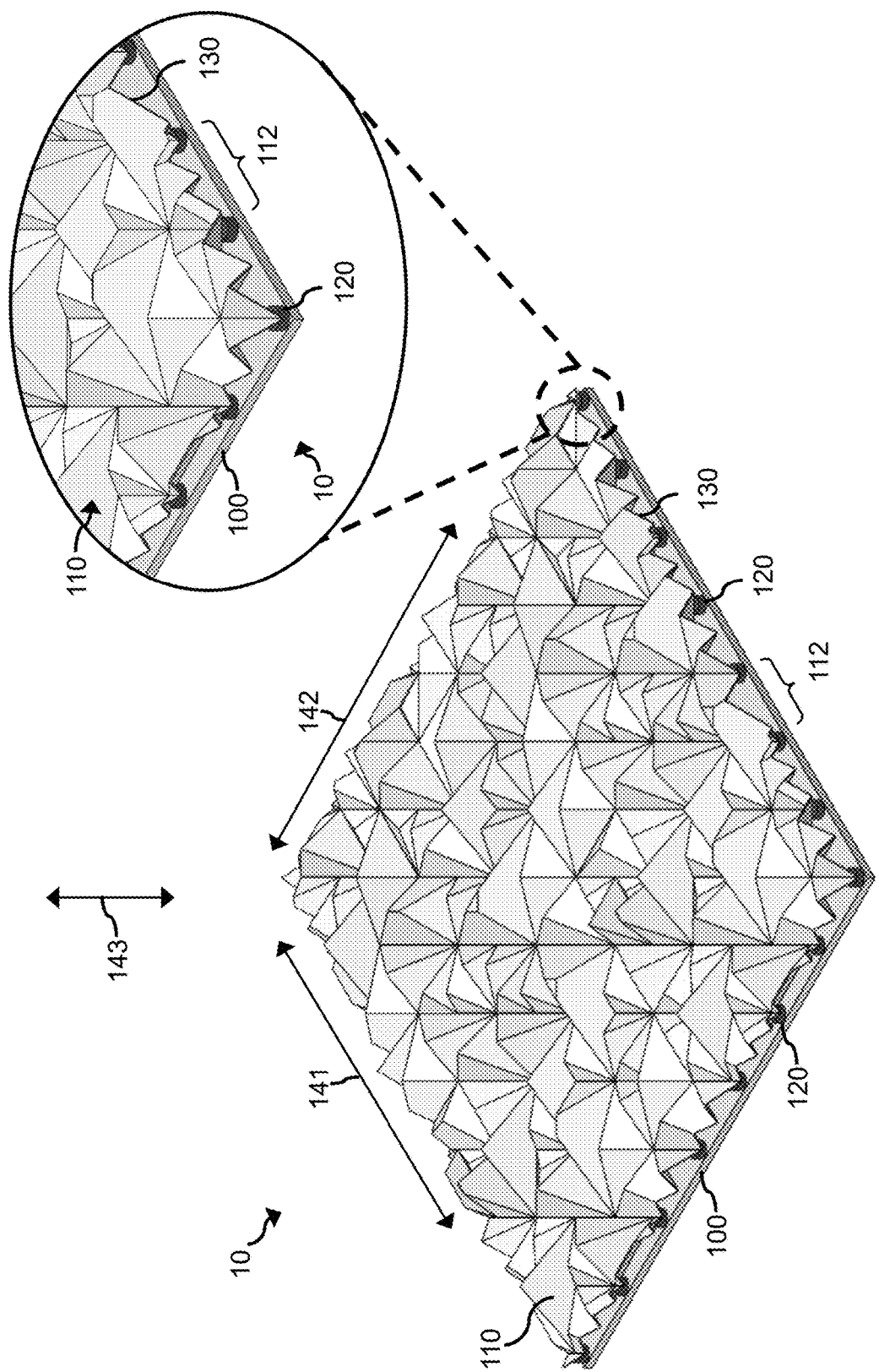
FIG. 1 is a perspective view of a biaxially stretchable laminated fabric composite material in a relaxed state according to an embodiment.

FIG. 1 is a perspective view of a biaxially stretchable laminated fabric composite material 10 in a relaxed state according to an embodiment. The composite material 10 includes a four-way stretchable substrate fabric 100 and a barrier film 110. The stretchable substrate fabric 100 and the barrier film 110 are attached at a series of individual bond points 120. The bond points 120 can be regularly and/or irregularly spaced with respect to the surface of the substrate fabric 100 and/or the barrier film 110. In the unbonded regions 112 between the bond points 120, the barrier film 110 is not bonded and decoupled from the substrate fabric 100.

The substrate fabric 100 can comprise or consist of any woven, knit, or non-woven fabric that is capable of reversibly stretching biaxially (4-way stretch) in the machine direction 141 and in the cross direction 142. In an embodiment, the substrate fabric 100 can bi-axially stretch up to 30% (e.g., from about 1% to about 30), up to about 50% (e.g., from about 1% to about 50%), up to about 100% (e.g., from about 1% to about 100%), or up to more than 100% from its relaxed state. That is, the dimensions of the substrate fabric 100 with respect to the machine and cross directions 141, 142 are up to 50%, up to 100%, or up to more than 100% larger in the biaxially-stretched state (FIG. 2) than in the relaxed state (FIG. 1). Upon removal of the biaxal-stretching force, the substrate fabric 100 returns to at least about 95% and preferably about 100% of its original dimensions, with respect to the machine and cross directions 141, 142, when transitioning back to the relaxed state from the biaxially-stretched state. The original dimensions are the dimensions, with respect to the machine and cross directions 141, 142, of the substrate fabric 100 in the relaxed state before any stretching forces are applied to the substrate fabric 100. Examples of 4-way stretchable fabrics for substrate fabric 100 include fabrics made by blending spandex (e.g., elastane or Lycra®) fibers along with other textile fibers such as polyester, nylon, nomex, rayon, modal, cotton, Lyocell and/or modacrylic fibers.

The barrier film 110 is in a randomly folded state. The random folds 130 in the barrier film 110 are present in three dimensions along the machine direction 141, the cross direction 142, and the orthogonal direction 143 of the composite material 10. The orthogonal direction 143 is the direction perpendicular to both the machine and cross directions 141, 142. The random folds 130 can be randomly oriented and/or multi-directional with respect to the machine direction 141, the cross direction 142, and/or the orthogonal direction 143. The random folds 130 do not have a preferred direction or orientation. The random folds 130 can alternately be referred to and/or can include crumples.

The bond points 120 can be formed using adhesive dots. While for the purpose of this disclosure, the shape of the adhesive dots is circular, hemispherical or spherical, the shape of the adhesive dots need not necessarily be one with an aspect ratio (length to width) of 1 and can include any other shape such as short dashes, rectangles, another regular shape, or an irregular shape. The adhesive dots can include any suitable adhesive that can form a bond between the substrate fabric 100 and the barrier film 110. In an embodiment, the adhesive dots can include an adhesive selected from the family of hot-melt adhesives, the family of ultraviolet (UV)-curable liquid adhesives, the family of heat-curable liquid adhesives, the family of moisture-curable 2-part liquid adhesives, the family of pressure-sensitive adhesives, and/or other adhesive families. The adhesive is preferably suitable to be applied in the form of small dots (or other geometric shape) via any process typically used in the industry such as gravure roll, rotary screen printing, jetting guns, screen printing, and/or another application process.

The adhesive can provide a bond strength between the substrate fabric 100 and the barrier film 110 having a range of about 0.1 lb per dot to about 5 lb per dot, including about 0.5 lb per dot, about 1 lb per dot, about 1.5 lb per dot, about 2 lb per dot, about 2.5 lb per dot, about 3 lb per dot, about 3.5 lb per dot, about 4 lb per dot, about 4.5 lb per dot, and any value or range between any two of the foregoing values. For example, the adhesive can provide a bond strength having a range of about 0.1 lb per dot to about 2 lb per dot or a range of about 0.25 lb per dot to about 1.5 lb per dot. The bond strength can be characterized as the raw forced to break the adhesive bond.

The adhesive dot size may be in the range of about 0.1 microliters to about 2 microliters (on a volume basis) including about 0.25 microliters, about 0.5 microliters, about 0.75 microliters, about 1 microliter, about 1.25 microliters, about 1.5 microliters, about 1.75 microliters, and any value or range between any two of the foregoing volumes. For example, the adhesive dot size can be in the range of about 0.1 microliters to about 1 microliter or the range of about 0.1 microliters to about 0.5 microliters. In general, the bond strength provided by the adhesive dot should be sufficient to prevent delamination and/or separation of the barrier film 110 and substrate fabric 100 during repeated biaxial stretching of the composite material 10. Biaxial stretching of the composite material 10 can include flexing, folding, unfolding, relaxing, elongating, twisting and/or crushing of the barrier film 110 and the substrate fabric 100. Biaxial stretching of the composite material 10 can optionally include biaxial stretching of the barrier film 110.

In an alternative embodiment, the bond points 120 can be formed by direct bonding without using an adhesive. For example, the bond points 120 can be formed using heat, radio-frequency (RF) energy, and/or ultrasonic bonding techniques. The bond strength of the bond points 120 formed without an adhesive can be equal to or about equal to the bond strength of the bond points 120 formed with an adhesive (e.g., with the adhesive dots). For example, the bond strength of the of bond points 120 formed without an adhesive (e.g., using heat, RF energy, and/or ultrasonic bonding techniques) can have a range of about 0.1 lb per bond point 120 to about 5 lb per bond point 120.

Figure 2:
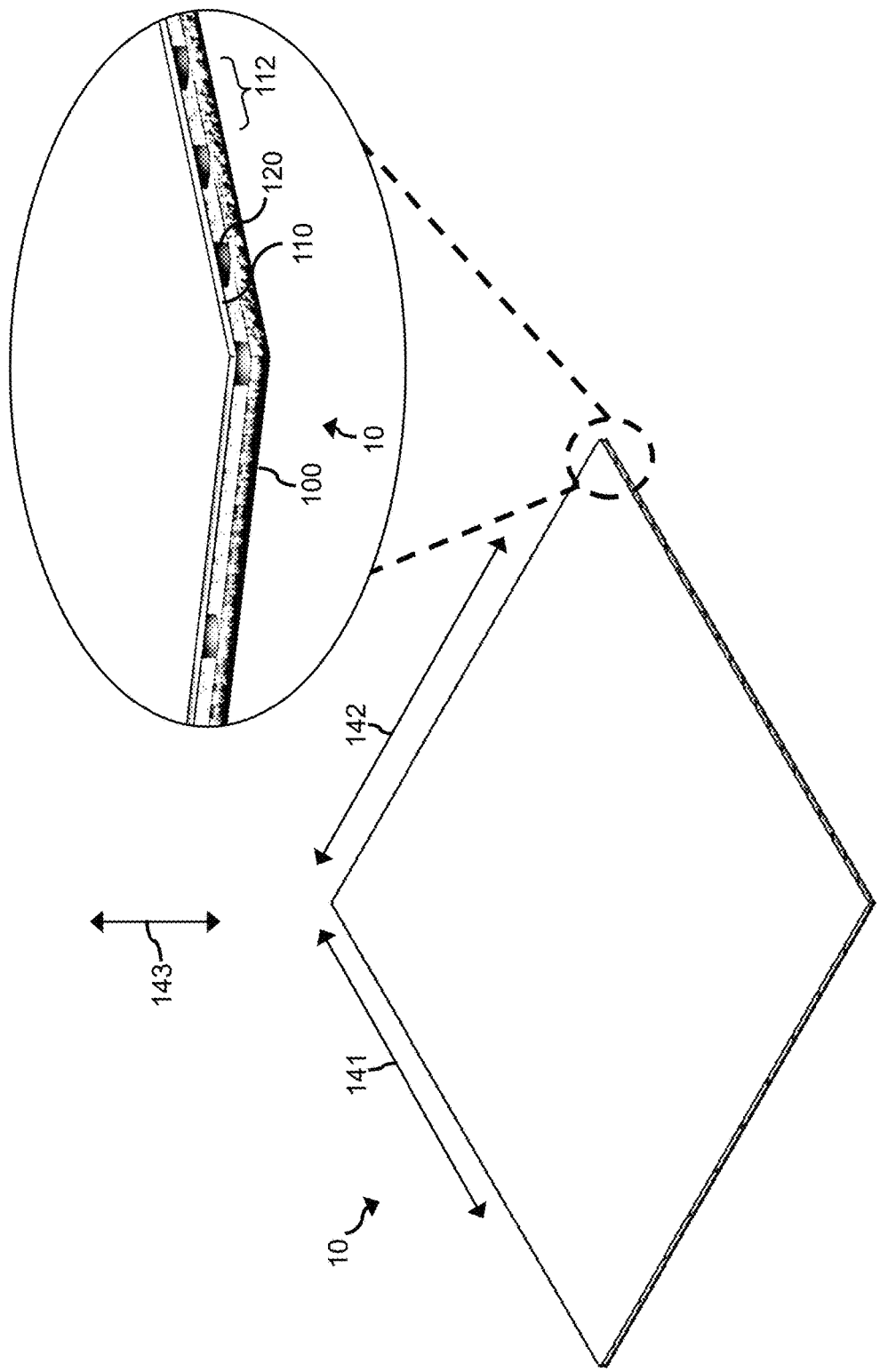
FIG. 2 is a perspective view of the composite material illustrated in FIG. 1 in a biaxially-stretched state according to an embodiment.

FIG. 2 is a perspective view of the composite material 10 in a biaxially-stretched state according to an embodiment. As the composite material 10 is biaxially stretched (i.e., with respect to the machine and cross directions 141, 142), the random folds 130 flatten without stretching the barrier film 110. The barrier film 110 is in a flattened state in this figure. The dimensions of the barrier film 110 with respect to the machine and cross directions 141, 142 are larger in the flattened state than they are in the randomly folded state (FIG. 1). The dimensions of the barrier film 110 can increase by about the same percentage as the substrate fabric 100, with respect to the machine and cross directions 141, 142, as the composite material 10 is biaxially stretched. For example, the dimensions of the substrate fabric 100 and the barrier film 110 can increase by about 20-25%, with respect to the machine and cross directions 141, 142, when composite material 10 transitions from a relaxed state (FIG. 1) to a biaxially-stretched state (FIG. 2).

Flattening the barrier film 110 allows the composite material 10 to reversibly biaxially elongate while maintaining the chemical barrier performance of the overall composite material 10. Flattening the barrier film 110 can include extending and/or unfolding (e.g., partially and/or fully) of the random folds 130 in the barrier film 110 to smoothen the unbonded regions 112 as the bond points 120 move while the composite material 10 is biaxially stretched. The barrier film 110 can be flattened without biaxially stretching or without substantially biaxially stretching the barrier film 110. For example, the barrier film 110 can be flattened while biaxially stretching the barrier film 110 to be between 0% and 5% greater than the dimensions of the barrier film 110 in the flattened state.

Further, the composite material 10 in the biaxially-stretched state is capable of returning to the relaxed state (FIG. 1), including the associated dimensions and/or form, when the stresses are removed. The composite material 10 can undergo reversible biaxial stretch and relaxation cycles (i.e., repeatedly transitioning between the relaxed state and the biaxially-stretched state), for example more than 100 cycles, more than 500 cycles, more than 1,000 cycles, more than 2,000 cycles, or more than another number of cycles, which can be greater than 2,000 cycles or less than 100 cycles, without compromising dimensional stability or chemical-barrier properties of the composite material 10.

The barrier film 110 is not stretched during flattening. In some embodiments, the barrier film 110 can reversibly biaxially stretch in addition to flatten. For example, the barrier film 110 can reversibly biaxially stretch up to about 5-8%, within the elastic region of the barrier film 110, compared to the dimensions of the barrier film 110 before stretching. The barrier film 110 is capable of returning to its original dimensions in the relaxed state (i.e., before being biaxially stretched) when the barrier film 110 is reversibly biaxially stretched. In other words, reversibly biaxially stretching does not include permanent plastic deformation of the barrier film 110. When the composite material 10 includes a barrier film 110 that can be reversibly biaxially stretched, the composite material 10 reversibly biaxially expand to larger dimensions in the stretched state compared to when the composite material 10 includes a barrier film 110 that cannot be reversibly biaxially stretched.

Figure 3:
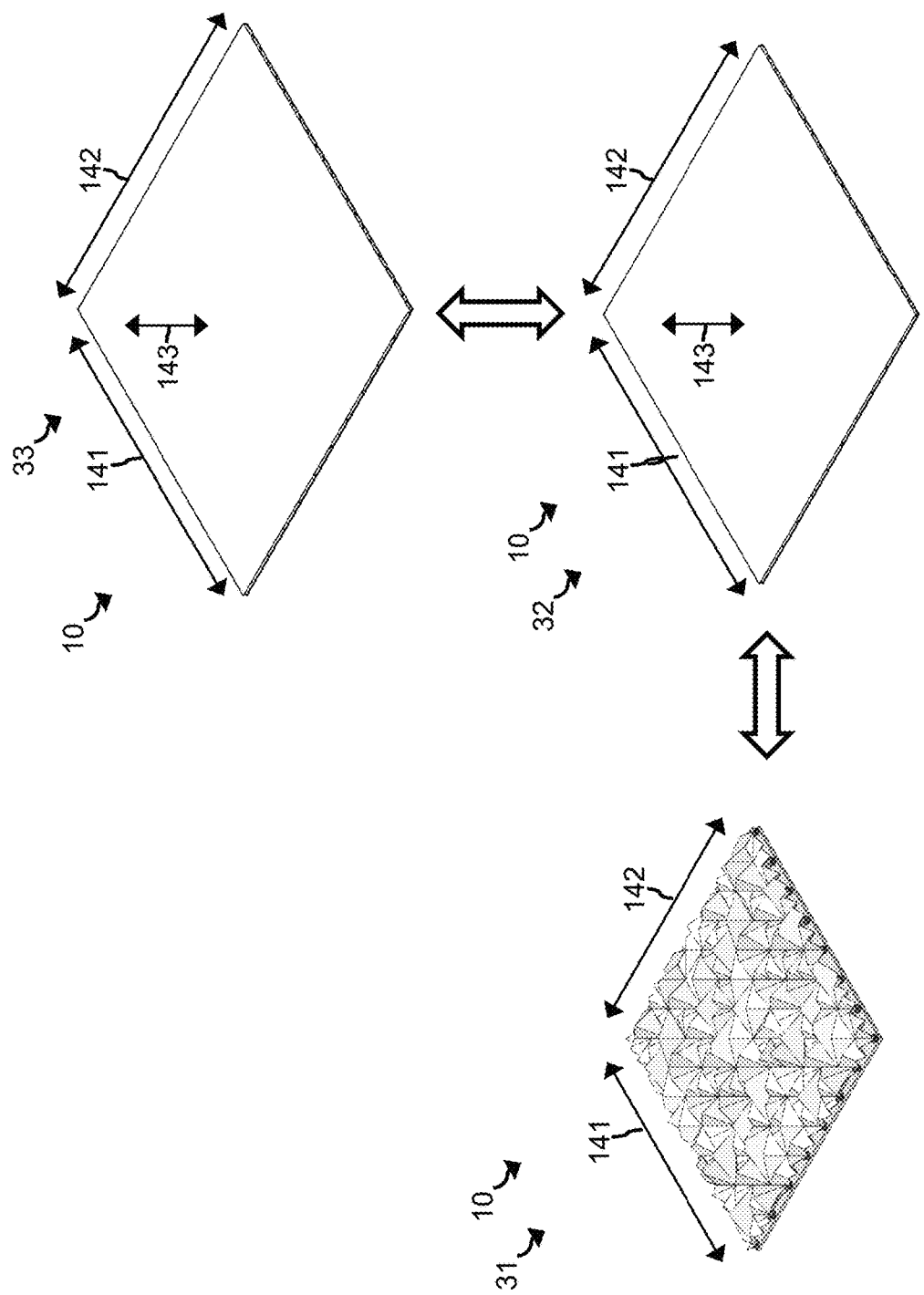
FIG. 3 is a perspective view of the composite material illustrated in FIGS. 1 and 2 reversibly transitioning between a relaxed state, a partially-stretched state, and an optional fully-stretched state.

An example illustration of the composite material 10 reversibly transitioning between a relaxed state 31, a partially-stretched state 32, and an optional fully-stretched state 33 is illustrated in FIG. 3. In the relaxed state 31, the barrier film 110 is in the randomly folded state. In the partially-stretched state 32, the composite material 10 is biaxially stretched such that the barrier film 110 is in the flattened or unfolded state. In the optional fully-stretched state 33, the composite material 10 is further biaxially stretched, compared to the partially-stretched state 32, such that the barrier film 110 is reversibly biaxially stretched within its elastic region. The dimensions along the machine and cross directions 141, 142 are larger when the composite material 10 is in the partially-stretched state 32 than in the relaxed state 31. The dimensions along the machine and cross directions 141, 142 are larger when the composite material 10 is in the fully-stretched state 33 than in the partially-stretched state 32 and the relaxed state 31.

A CBRN garment formed with the composite material 10 is more comfortable to the wearer by stretching and conforming to body movements without degrading chemical-protection properties. The composite material 10 can have a minimum thickness (as measured with respect to the orthogonal axis 143) equal to the thickness of the substrate fabric 100 and the barrier film 110 and/or a maximum thickness of about 0.5 inches. In some embodiments, the thickness of the composite material 10 is about 1/16 inches.

Figure 4:
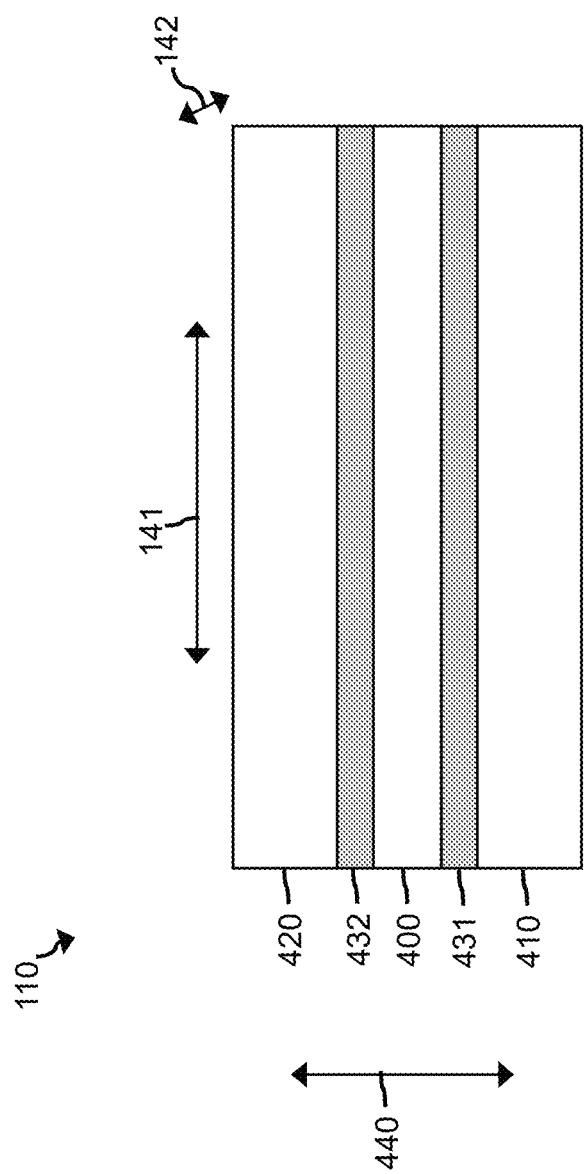
FIG. 4 is a cross-sectional illustration of the barrier film illustrated in FIGS. 1-3 according to an embodiment.

FIG. 4 is a cross-sectional illustration of the barrier film 110 according to an embodiment. The barrier film 110 includes a central barrier layer 400 sandwiched between outer flexible layers 410, 420. An optional tie layer 431 can be located between the barrier layer 400 and outer flexible layer 410. Additionally or alternatively, an optional tie layer 432 can be located between the barrier layer 410 and outer flexible layer 420.

The barrier layer 400 can comprise or consist of an ethylene vinyl alcohol (EVOH) polymer, a polyamide, a polyester, polyvinylidene chloride, polyvinyl chloride, polytetrafluoroethylene, chloroprene, or butyl rubber. When the barrier layer 400 comprises or consists of an EVOH polymer, the EVOH polymer can be any grade with an ethylene content ranging from about 24 mol % to about 48 mol %, including about 30 mol %, about 36 mol %, and/or about 42 mol %. In some embodiments, an EVOH barrier polymer with about 44 mol % of ethylene can provide optimum flexibility and chemical-barrier properties.

The barrier layer 400 has sufficient resistance to toxic chemicals such that the barrier layer 400 can prevent toxic chemicals from permeating therethrough for at least 60 minutes, including at least 120 minutes, at least 180 minutes, at least 240 minutes, at least 300 minutes, at least 360 minutes, at least 420 minutes, and/or at least 480 minutes, including any time or range between any two of the foregoing times. The time that the barrier layer 400 is resistant to toxic chemical permeating therethrough can be referred to as the breakthrough time of the barrier layer 400. The barrier layer 400 is resistant to (e.g., to the permeation of) toxic chemicals as listed in the National Fire Protection Association (NFPA) specifications such as the NFPA 1992 and/or the NFPA 1994 specifications. Examples of toxic chemicals to which the barrier layer 400 is resistant include, but not limited to, tetrachloroethylene, toluene, diethylamine, ammonia, chlorine, carbon disulfide, acids such as sulfuric acid and including chemical warfare agents such as sulfur mustard (HD) and nerve agents such as Tabun (GA), Sarin (GB), Soman (GD) and Venomous agent X (VX). The barrier layer 400 has the same resistance to the toxic chemicals regardless of whether the barrier layer 400 is in a randomly folded state, a flat state, or a reversibly-stretched state.

The outer flexible layers 410, 420 can comprise or consist of a thermoplastic polyurethane (TPU), thermoplastic polyolefin elastomers and/or plastomers, ethylene vinyl acetate copolymers, styrene-butadiene copolymers, and/or elastomers or rubbers such as butyl rubber, halobutyl rubbers, neoprene, nitrile, ethylene propylene diene monomer rubber (EPDM), silicone and the like. The outer flexible layers 410, 420 can be any grade that is processable into films via melt extrusion, though softer grades are preferable from the film-flexibility standpoint. The outer flexible layers 410, 420 are preferably formed of the same material(s).

The optional tie layers 431, 432 can comprise or consist of tie polymers such as ethylene methacrylate copolymers, ethylene methacrylic acid copolymers, ethylene acrylic acid copolymers, maleic anhydride or anhydride modified polyolefin polymer, ethylene vinyl acetate copolymer, anhydride modified ethylene vinyl acetate polymer, and/or anhydride modified ethylene acrylate copolymer.

The central barrier layer 400 is configured to provide the primary barrier to permeation of toxic chemicals through the barrier film 110. The outer flexible layers 410, 420 are configured to provide flexibility and provide a surface that can be easily bonded to the substrate fabric. The optional tie layer(s) 431, 432 can be configured to improve the adhesion between the central barrier layer 400 and either or both outer flexible layers 410, 420.

The central barrier layer 400 can have a thickness of about 0.1 mil to about 1 mil, including about 0.25 mil, about 0.5 mil, about 0.75 mil, and any value or range between any two of the foregoing thicknesses. The thickness of each outer flexible layer 410, 420 can be about 0.1 mil to about 2 mil, including about 0.5 mil, about 0.75 mil, about 1 mil, about 1.25 mil, about 1.5 mil, about 1.75 mil, and any value or range between any two of the foregoing thicknesses. In one example, the thickness of each outer flexible layer 410, 420 can be about 0.1 mil to about 1 mil, including about 0.25 mil, about 0.5 mil, about 0.75 mil, and any value or range between any two of the foregoing thicknesses.

The thickness of each optional tie layer 431, 432 can be about 0.1 mil to about 0.5 mil, including about 0.2 mil, about 0.3 mil, about 0.4 mil, and any value or range between any two of the foregoing thicknesses. The thickness of a tie layer is 0 mil when that tie layer is not included in the barrier film 110. The thickness of each layer 400, 410, 420, 431, 432 is measured with respect to an axis 440, which is orthogonal to the machine and cross axes 141, 142.

Figure 5:
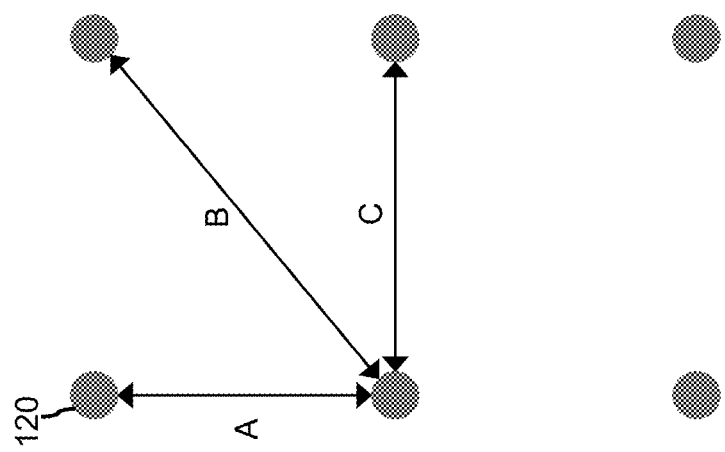
FIGS. 5 and 6 are schematic diagrams of the bond points in the composite material illustrated in FIGS. 1-3 according to different embodiments.
Figure 6:
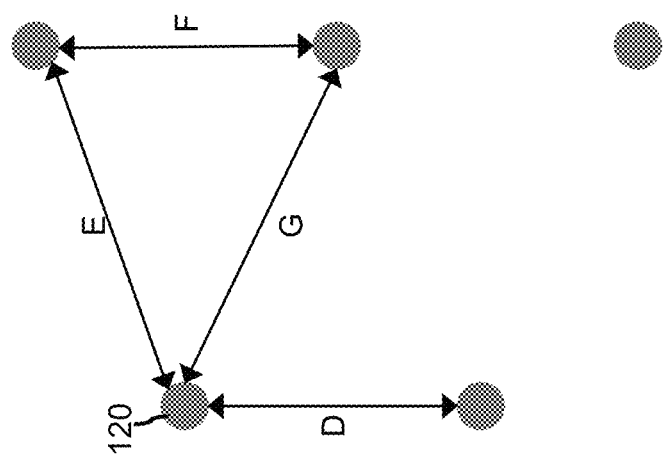

FIGS. 5 and 6 are schematic diagrams of the bond points 120 in the composite material according to different embodiments. In FIG. 5, the bond points 120 are arranged in a rectangular grid pattern. In FIG. 6, the bond points 120 are arranged in an alternating pattern. The straight-line distance between adjacent bond points 120 (e.g., distances A-C in FIG. 5 and distances D-G in FIG. 6), as measured when the material 10 is in the biaxially-stretched state, can be at least about 0.1 inches. For example, the straight-line distance between adjacent bond points 120, as measured when the material 10 is in the biaxially-stretched state, can be about 0.1 inches to about 2 inches, including about 0.25 inches, about 0.5 inches, about 0.75 inches, about 1 inch, about 1.25 inches, about 1.5 inches, about 1.75 inches, and any value or range between any two of the foregoing distances. In another embodiment, the straight-line distance between adjacent bond points 120 can be greater than about 2 inches. The straight-line distance between adjacent bond points 120 is preferably at least large enough that neighboring/adjacent bond points 120 do not touch each other and remain separated and independent when the material 10 is in the relaxed state. The straight-line distance is measured with respect to an axis that lies within or parallel to the plane defined by the machine and cross directions.

Figure 7:
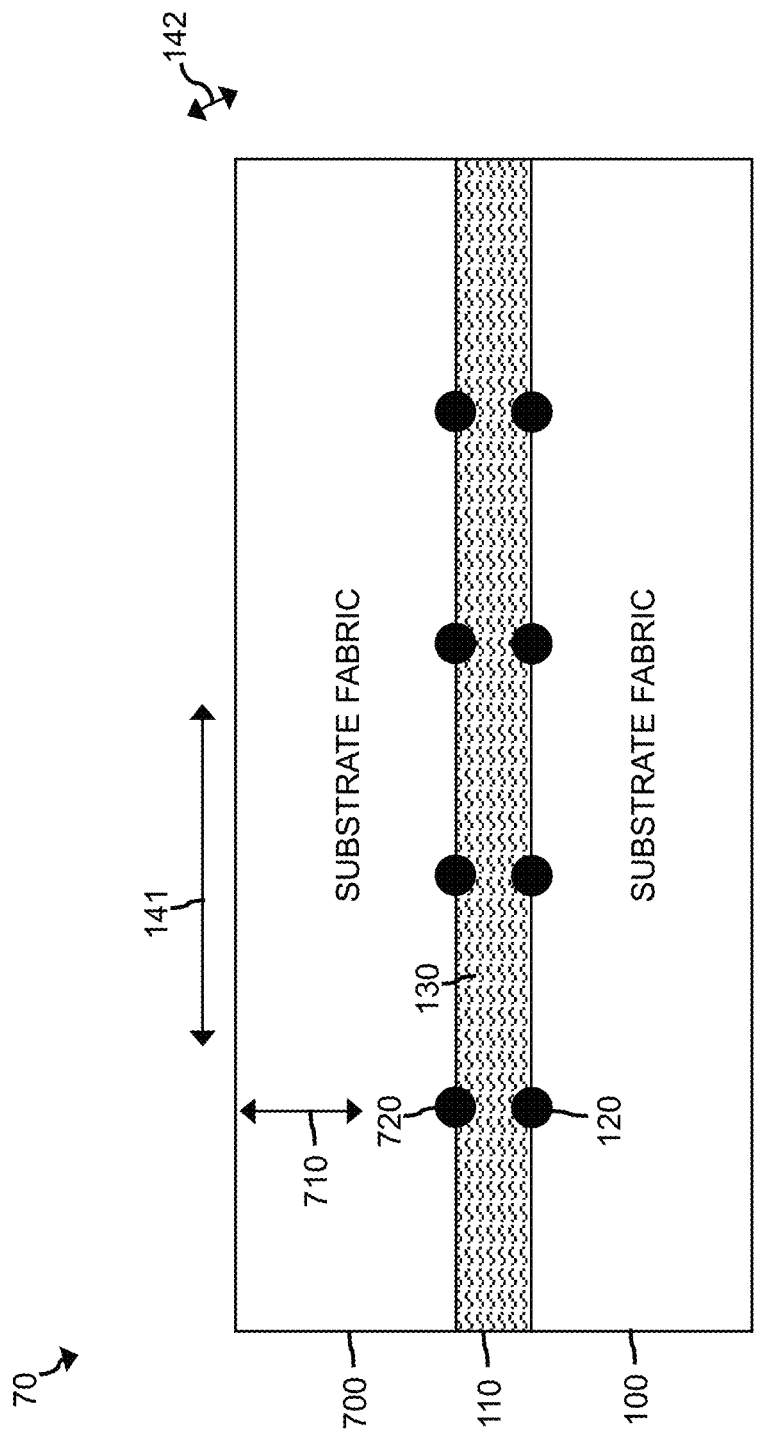
FIG. 7 is a side view of a biaxially stretchable laminated fabric composite material in a relaxed state according to another embodiment.

FIG. 7 is a side view of a biaxially stretchable laminated fabric composite material 70 in a relaxed state according to an embodiment. The composite material 70 is the same as the composite material 10 except that composite material 70 includes two substrate fabric layers while composite material 10 only include one substrate fabric layer.

In composite material 70, the barrier film 110 is attached to a pair of four-way stretchable substrate fabrics 100, 700. The first substrate fabric 100 is attached to the barrier film 110 at a series of individual bond points 120 as in composite material 10. A second substrate fabric 700 is attached to the barrier film 110 at a series of individual bond points 720. The bond points 120, 720 are aligned with respect to respective axes, such as axis 710, that are orthogonal to the machine and cross directions 141, 142, such that the bond points 120, 720 are located at the same or about the same locations (e.g., within about 0.05 inches or another straight-line distance of each other) relative to the barrier film 110. The straight-line distance between neighboring bond points 720 is the same as the straight-line distance between neighboring bond points 120.

The second substrate fabric 700 can be the same as or different than the first substrate fabric 100. The first and second substrate fabrics 100, 700 can have the same or similar stretch and relaxation properties. Additionally or alternatively, the bond points 720 can be the same as bond points 120.

The composite material 70 is in the relaxed state in FIG. 7 such that random folds 130 are formed in the unbonded regions of the barrier film 110 between bond points 120, 720.

Figure 8:
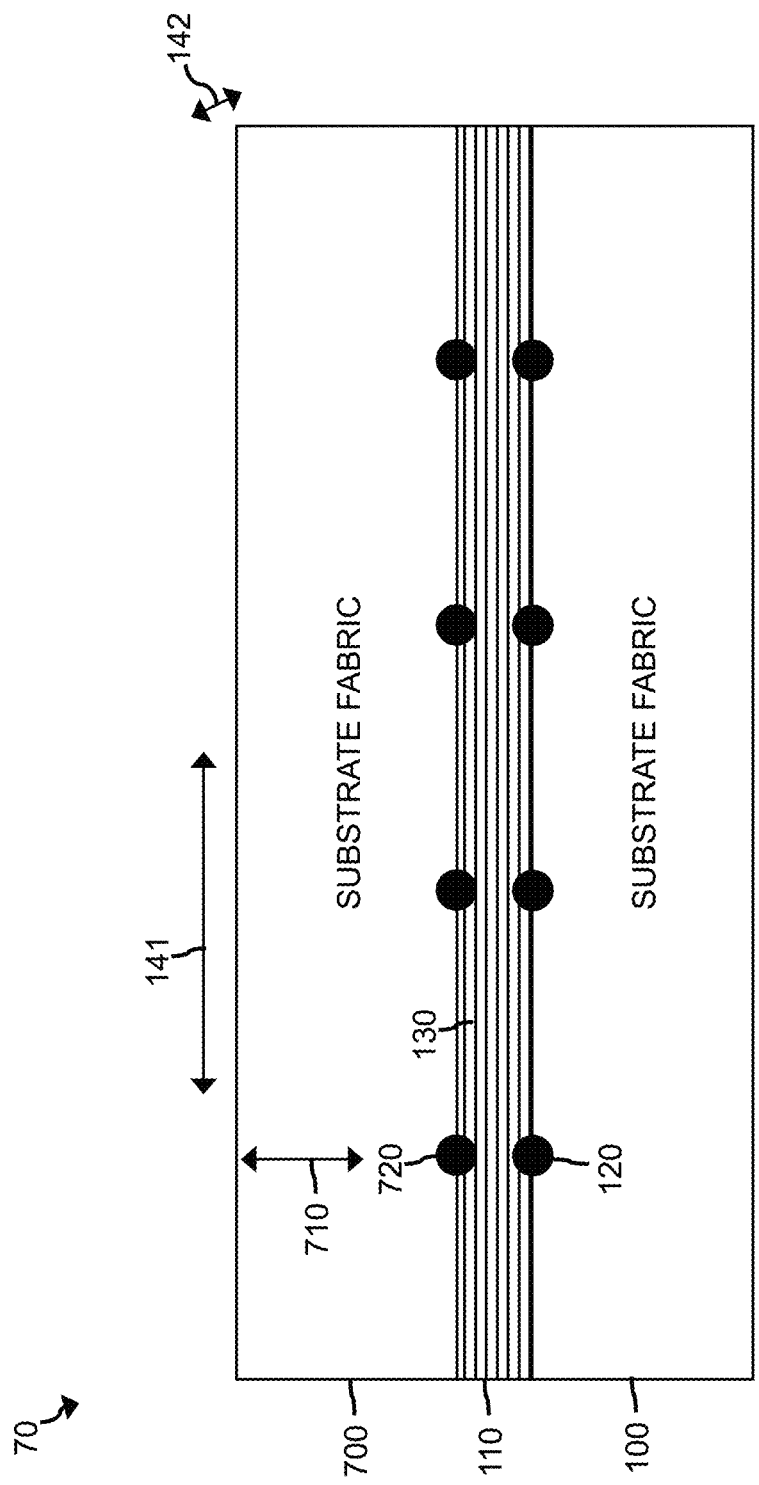
FIG. 8 is a side view of the composite material illustrated in FIG. 7 in a biaxially-stretched state according to an embodiment.

The composite material 70 is in a biaxially-stretched state in FIG. 8 such that the random folds 130 are flattened to transition the barrier film 110 to a flattened state. In some embodiments, the barrier film 110 can reversibly biaxially stretch within its elastic region to allow the composite material 70 to be biaxially stretched further. When the barrier film 110 can reversibly biaxially stretch within its elastic region, the composite material 70 can reversibly transition between a flat state, a partially-stretched state, and a fully-stretched state, for example as described above with respect to FIG. 3. The partially-stretched and fully-stretched states would appear the same as illustrated in FIG. 8 except that the dimensions of the composite material 70 with respect to the machine and cross directions 141, 142 would be larger when the composite material 70 is in the fully-stretched state than when the composite material 70 is in the partially-stretched state. The alignment of the bond points 120, 720 is determined and/or measured when the composite material 70 is in the biaxially-stretched state.

Figure 9:
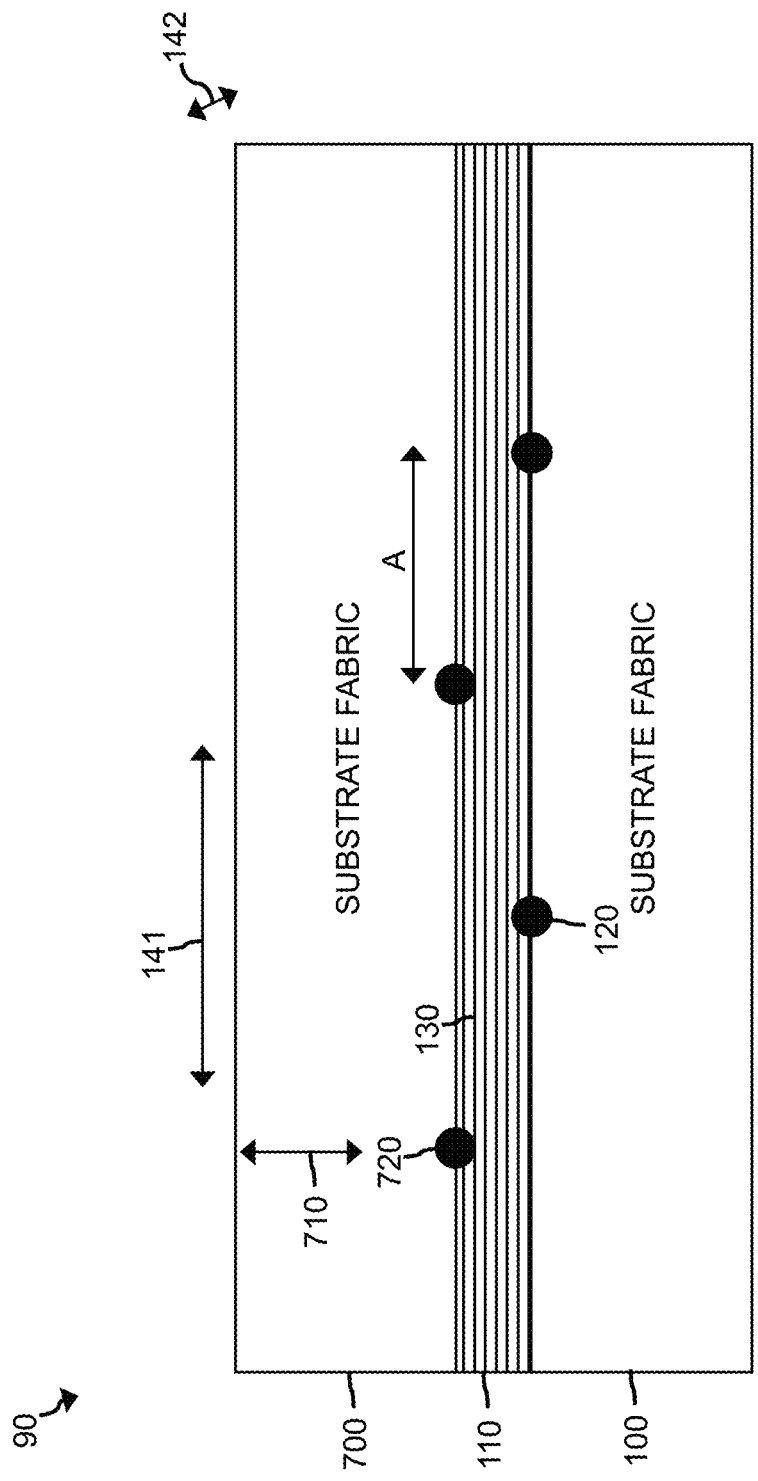
FIG. 9 is a side view of a biaxially stretchable laminated fabric composite material in a biaxially-stretched state according to another embodiment.

FIG. 9 is a side view of a biaxially stretchable laminated fabric composite material 90 in a biaxially-stretched state according to another embodiment. In this embodiment, the bond points 120, 720 are offset from each other with respect to respective axes, such as axis 710. The bond points 120, 720 having an alternating pattern where a bond point 120 is located between neighboring bond points 720 and a bond point 720 is located between neighboring bond points 120. The barrier film 110 is in a flattened state in FIG. 9.

The straight-line distance (e.g., distance A) between a bond point 120 and a neighboring bond point 720 (or vice versa), as measured when the composite material 70 is in the biaxially-stretched state, can be about 0.1 inches to about 2 inches, including about 0.25 inches, about 0.5 inches, about 0.75 inches, about 1 inch, about 1.25 inches, about 1.5 inches, about 1.75 inches, and any value or range between any two of the foregoing distances. In another embodiment, the straight-line distance between adjacent bond points 120 can be greater than about 2 inches. The straight-line distance is preferably at least large enough that neighboring/adjacent bond points 120, 720 do not overlap (e.g., with respect to respective axes, such as axis 710) and remain separated and independent when the composite material 90 is in the relaxed state. The straight-line distance is measured with respect to an axis that lies within or parallel to the plane defined by the machine and cross directions 141, 142. In FIG. 9, the axis is parallel to the machine direction 141.

The relaxed state of the composite material 90 can appear the same as or similar to the relaxed state of the composite material 70 illustrated in FIG. 7.

Figure 10:
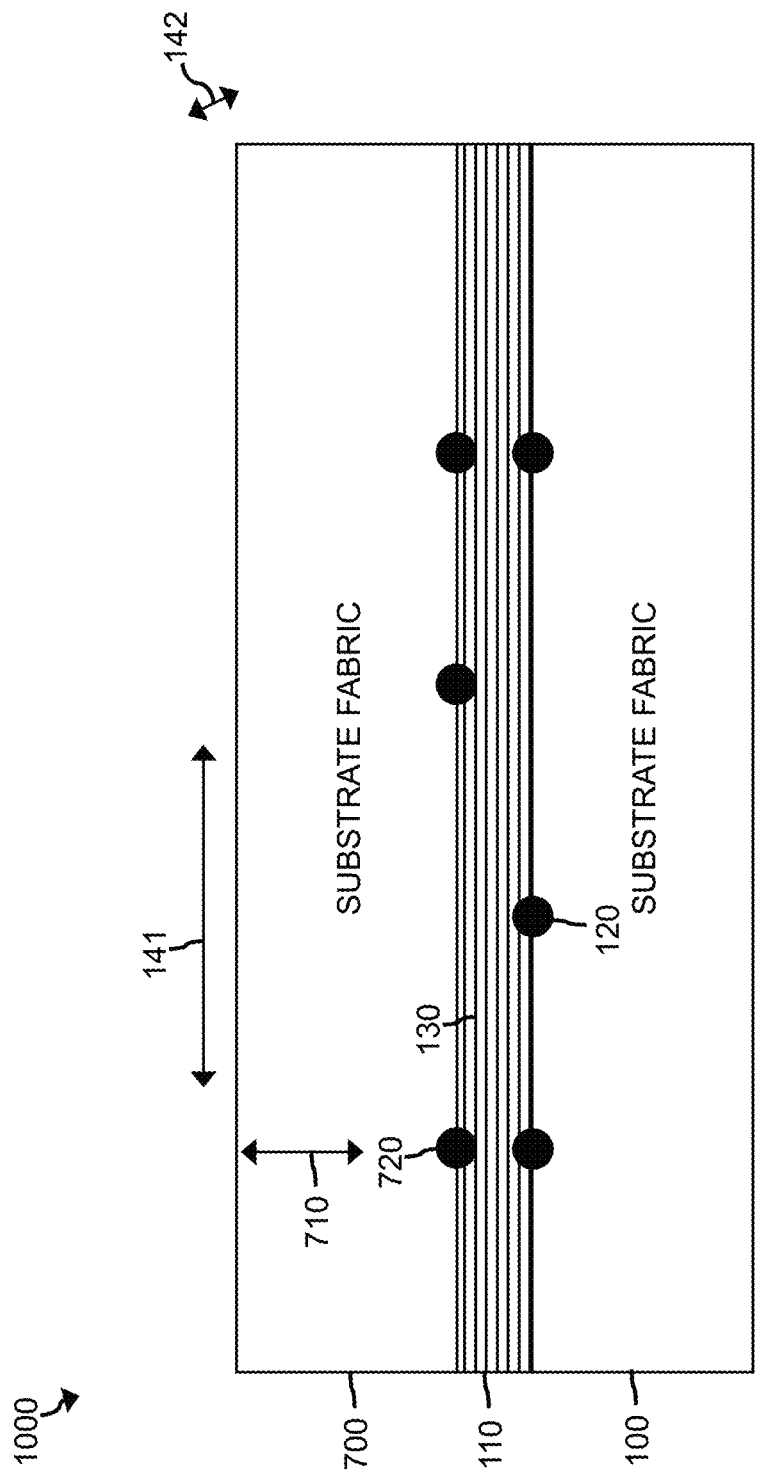
FIG. 10 is a side view of a biaxially stretchable laminated fabric composite material in a biaxially-stretched state according to another embodiment.

FIG. 10 is a side view of a biaxially stretchable laminated fabric composite material 1000 in a biaxially-stretched state according to another embodiment. The bond points 120, 720 in composite material 1000 are in a hybrid configuration of the bond points 120, 720 in composite materials 70 and 90. In composite material 1000, some of the bond points 120, 720 are aligned and some of the bond points 120, 720 are offset from each other. As discussed above, the alignment of and straight-line distance between neighboring bond points 120, 720 are determined when the composite material is in the biaxially-stretched state and with respect to respective axes, such as axis 710, that are orthogonal to the machine and cross directions 141, 142. The barrier film 110 is in a flattened state in FIG. 10.

The relaxed state of the composite material 1000 can appear the same as or similar to the relaxed state of the composite material 70 illustrated in FIG. 7.

Figure 11:
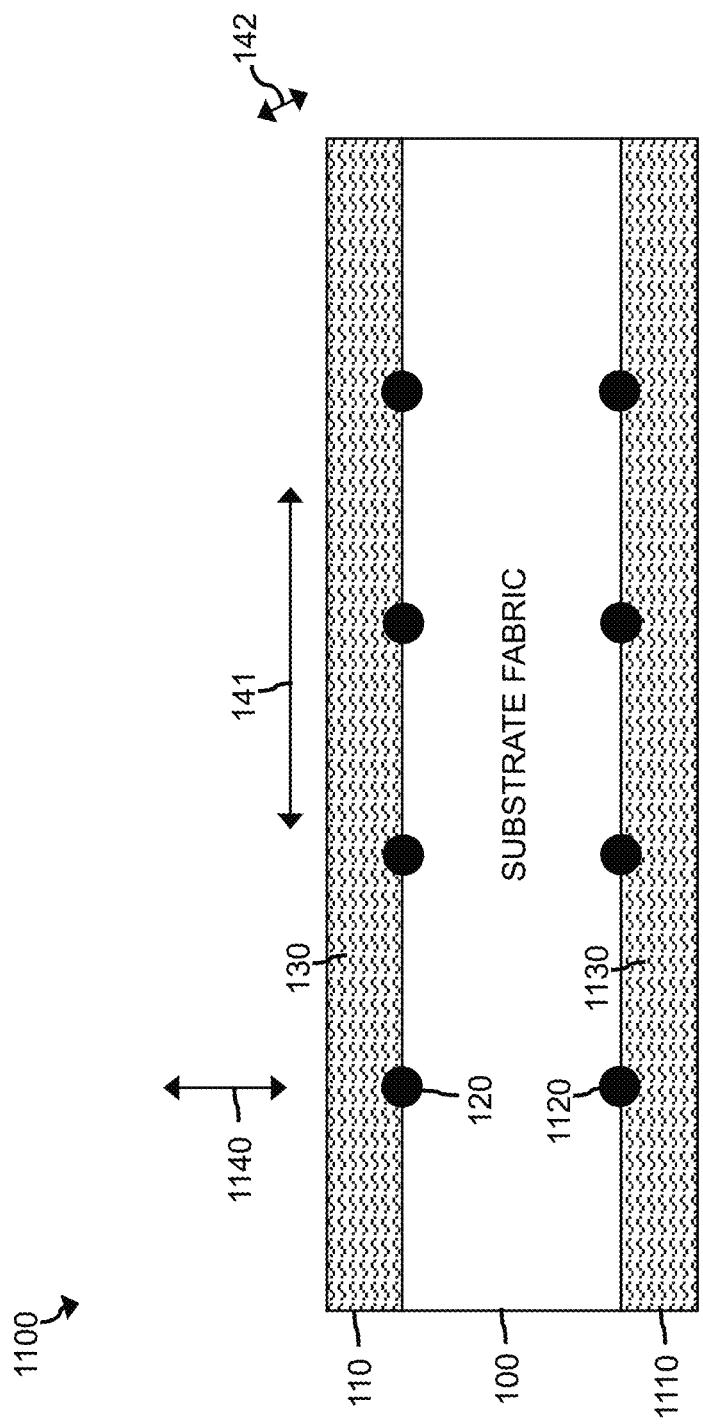
FIG. 11 is a side view of a biaxially stretchable laminated fabric composite material in a relaxed state according to another embodiment.

FIG. 11 is a side view of a biaxially stretchable laminated fabric composite material 1100 in a relaxed state according to another embodiment. The composite material 1100 is the same as the composite material 10 except that composite material 1100 includes two barrier film layers while composite material 10 only include one barrier film layer.

In composite material 1100, the substrate fabric 100 is attached to a pair of barrier films 110, 1110. The substrate fabric 100 is attached to the first barrier film 110 at a series of individual bond points 120 as in composite material 10. The substrate fabric 100 is attached to the second barrier film 1110 at a series of individual bond points 1120. The bond points 120, 1120 are aligned with respect to respective axes, such as axis 1140, that are orthogonal to the machine and cross directions 141, 142, such that the bond points 120, 1120 are located at the same or about the same locations (e.g., within about 0.05 inches or another straight-line distance of each other) relative to the substrate fabric 100. The straight-line distance between neighboring bond points 1120 is the same as the straight-line distance between neighboring bond points 120.

The second barrier film 1110 can be the same as or different than the first barrier film 110. In an embodiment, the first barrier film 110 can be configured to provide protection for chemicals (or certain chemicals) and the second barrier film 1110 can be configured to provide protection for other chemicals and/or for biological, radioactive, and/or nuclear agents/toxins. When the first and second barrier films 110, 1110 can reversibly biaxially stretch, the first and second barrier films 110, 1110 can have the same or similar stretch and relaxation properties. Additionally or alternatively, the bond points 1120 can be the same as bond points 120.

The composite material 1100 is in the relaxed state in FIG. 11 such that random folds 130, 1130 are formed in the unbonded regions of the first and second barrier films 110, 1110 between bond points 120, 1120, respectively. Random folds 1130 can be the same as or similar to random folds 130.

Figure 12:
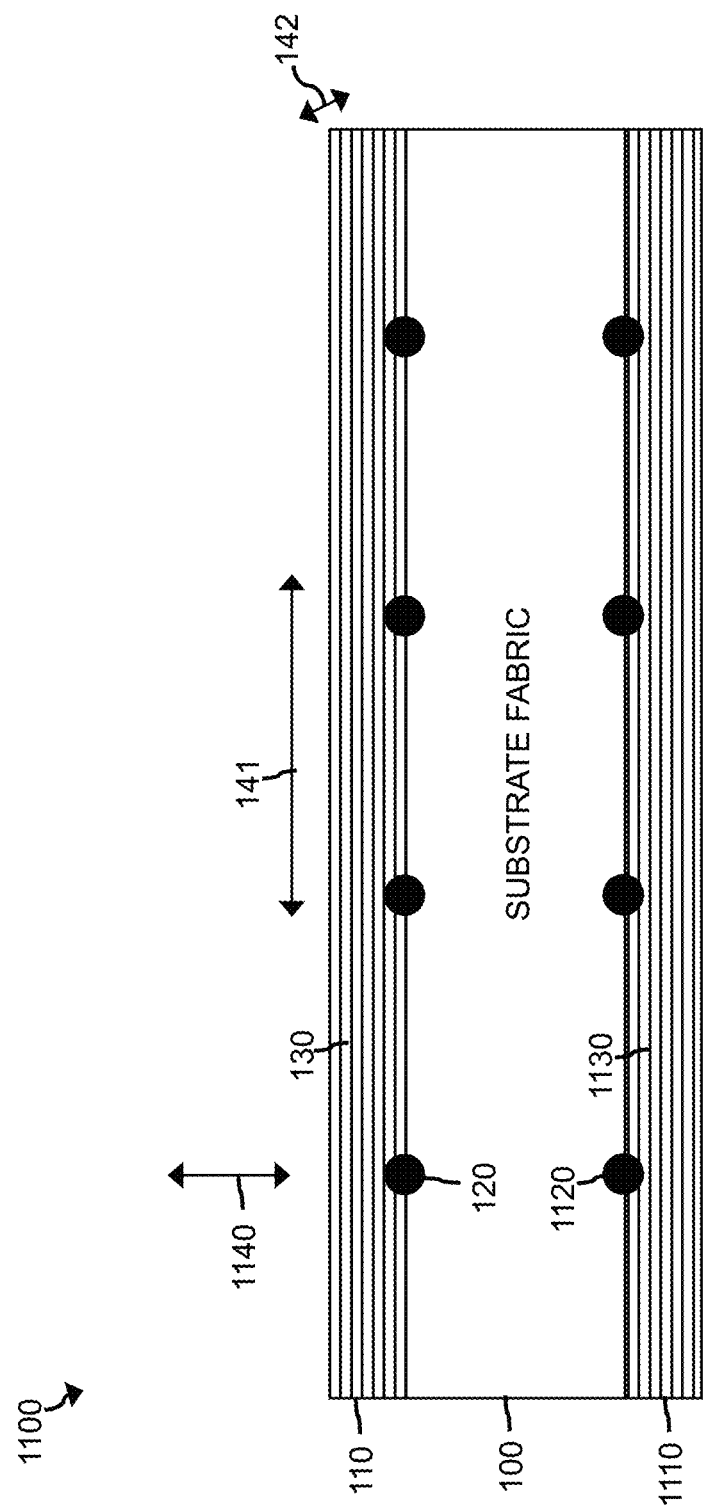
FIG. 12 is a biaxially stretchable laminated fabric composite material illustrated in FIG. 11 in a biaxially-stretched state according to an embodiment.

The composite material 1100 is in a biaxially-stretched state in FIG. 12 such that the random folds 130, 1130 are flattened to transition the first and second barrier films 110, 1110 to a flattened state. In some embodiments, the first and second barrier films 110, 1110 can reversibly biaxially stretch within their elastic regions to allow the composite material 1100 to be biaxially stretched further. When the first and second barrier films 110, 1110 can reversibly biaxially stretch within their elastic regions, the composite material 1100 can reversibly transition between a flat state, a partially-stretched state, and a fully-stretched state, for example as described above with respect to FIG. 3. The partially-stretched and fully-stretched states would appear the same as illustrated in FIG. 12 except that the dimensions of the composite material 1100 with respect to the machine and cross directions 141, 142 would be larger when the composite material 1100 is in the fully-stretched state than when the composite material 1100 is in the partially-stretched state.

Combinations of the embodiments illustrated in FIGS. 7-12 are possible. For example, the bond points 120, 1120 can be offset with respect to each other. Alternatively, some of the some of the bond points 120, 1120 can be aligned with each other and some of the bond points 120, 1120 can offset from each other. In another combination, the composite material includes an alternating arrangement of barrier film layers and substrate fabric layers. Each barrier layer film can be configured to provide the same or different CBRN protection.

Figure 13:
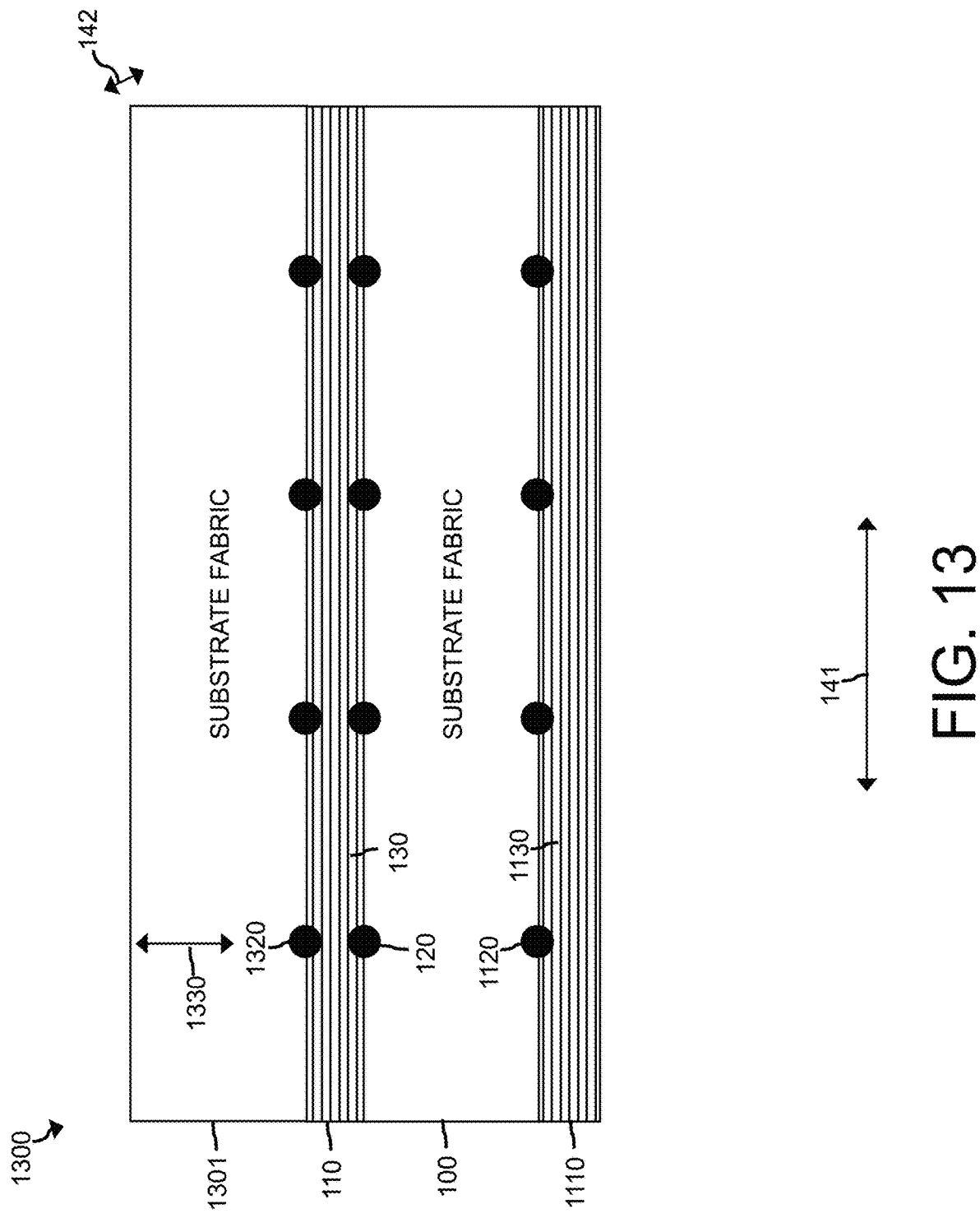
FIG. 13 is a side view of a biaxially stretchable laminated fabric composite material according to another embodiment.

FIG. 13 is a side view of a biaxially stretchable laminated fabric composite material 1300 according to an embodiment. The composite material 1300 is the same as the composite material 1100 except that composite material 1300 includes two barrier film layers 110, 1110 and two substrate fabric layers 100, 1301 while composite material 1100 includes two barrier film layers 110, 1110 and one substrate fabric layer 100. The composite material 1300 is only illustrated in a biaxially-stretched state where the first and second barrier films 110, 1110 are in a flattened state. The composite material 1300 can transition to a relaxed state the first and second barrier films 110, 1110 are in a random three-dimensional folded state similar to composite material 1100.

The first and second barrier film layers 110, 1110 can be configured to provide the same or different CBRN protection. For example, the first film layer 110 can be configured to provide protection for chemicals (or certain chemicals) and the second barrier film 1110 can be configured to provide protection for other chemicals and/or for biological, radioactive, and/or nuclear agents/toxins.

In composite material 1300, the first substrate fabric 100 is attached to first and second barrier films 110, 1110 and the second substrate fabric 1301 is attached to the first barrier film 110, forming an alternating arrangement of substrate fabrics and barrier films. The second substrate fabric 1301 is attached to the first barrier film 110 at a series of individual bond points 1320. The substrate fabric 100 is attached to the second barrier film 1110 at a series of individual bond points 1120. The first substrate fabric 100 is attached to the first barrier film 110 at a series of individual bond points 120 as in composite material 10. The bond points 120, 1120, 1320 are aligned with respect to respective axes, such as axis 1330, that are orthogonal to the machine and cross directions 141, 142, such that the bond points 120, 1120, 1320 are located at the same or about the same locations (e.g., within about 0.05 inches or another straight-line distance of each other) relative to the substrate fabrics 100, 1301. The straight-line distance between neighboring bond points 1320 is the same as the straight-line distance between neighboring bond points 1120 and the straight-line distance between neighboring bond points 120. In an alternative embodiment, some or all of the bond points 120, 1120, and/or 1320 are offset from one another, for example similar to composite materials 90 and/or 1000.

The alternating arrangement of barrier film layers and substrate fabric layers can be extended to include a third substrate fabric and/or a third barrier film. The third substrate fabric can be attached to the second barrier film 1110 at individual bond points. The third barrier film can be attached to the second substrate fabric 1301 at individual bond points. Additional barrier film layer(s) and/or substrate fabric layer(s) can be attached at individual bond points in a similar manner an outer substrate fabric layer and/or an outer barrier film layer, respectively.

Each barrier film can be configured to provide a different type of protection. For example, the composite material can include a first barrier film that can be configured to provide chemical protection, a second barrier film that can be configured to provide biological protection, a third barrier film that can be configured to provide radioactive protection, and/or a fourth barrier film that can be configured to provide nuclear protection.

In another example, the composite material can include a first barrier film that can be configured to provide a first type of chemical protection, a second barrier film that can be configured to provide a second type of chemical protection, a third barrier film that can be configured to provide a third type of chemical protection, and/or a fourth barrier film that can be configured to provide a fourth type of chemical protection.

In another example, the composite material can include a first barrier film that can be configured to provide a first type of biological protection, a second barrier film that can be configured to provide a second type of biological protection, a third barrier film that can be configured to provide a third type of biological protection, and/or a fourth barrier film that can be configured to provide a fourth type of biological protection.

In another example, the composite material can include a first barrier film that can be configured to provide a first type of radiation protection, a second barrier film that can be configured to provide a second type of radiation protection, a third barrier film that can be configured to provide a third type of radiation protection, and/or a fourth barrier film that can be configured to provide a fourth type of radiation protection.

In another example, the composite material can include a first barrier film that can be configured to provide a first type of nuclear protection, a second barrier film that can be configured to provide a second type of nuclear protection, a third barrier film that can be configured to provide a third type of nuclear protection, and/or a fourth barrier film that can be configured to provide a fourth type of nuclear protection.

Combinations of any of the foregoing are possible.

Figure 14:
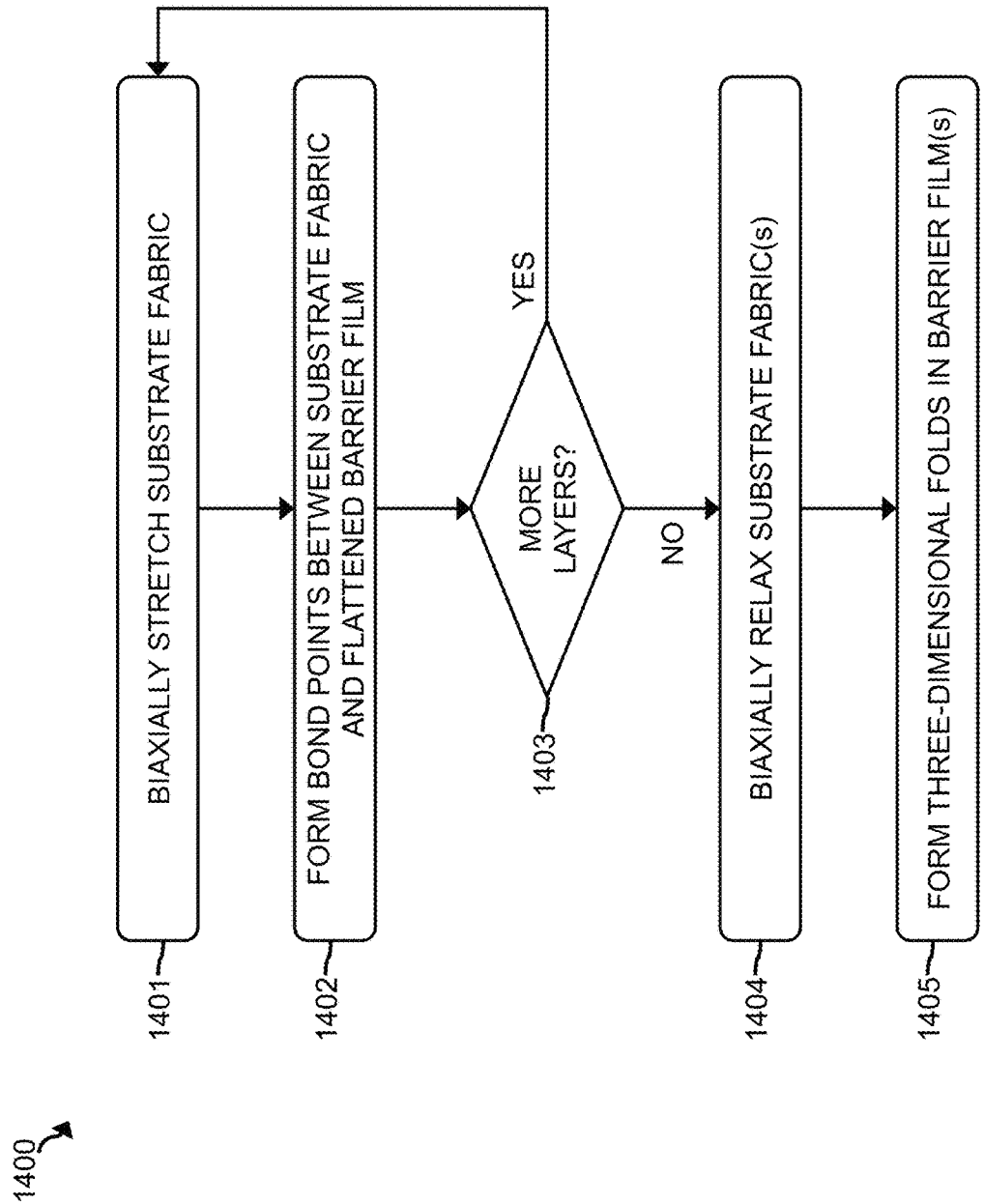
FIG. 14 is a flow chart of a method for manufacturing a biaxially stretchable laminated fabric composite material according to an embodiment.

FIG. 14 is a flow chart of a method 1400 for manufacturing a biaxially stretchable laminated fabric composite material according to an embodiment. Method 1400 can be used to make composite material 10, 70, 90, 1000, 1100, 1300, or 1600.

In step 1401, a substrate fabric is biaxially stretched to the extent of elongation desired or required in the final laminated fabric composite material. The substrate fabric can be the same as substrate fabric 100.

The substrate fabric is preferably stretched equally or approximately equally in all four directions (e.g., in opposite directions in the machine direction and in opposite directions in the cross direction). Approximately the same stretching can mean that the magnitude of the elongation is within plus or minus about 1 to about 10% in each direction, including about 3%, about 5%, about 7%, and about 9%, including any value or range between any two of the foregoing percentages. In one example, the substrate fabric is stretched uniaxially with respect to a first axis (e.g., parallel to the machine direction) and then, while maintaining the stretch with respect to the first axis, the substrate fabric is then stretched with respect to a second axis (e.g., parallel to the cross direction) that is orthogonal to the first axis, such that a biaxal (e.g., four-way) stretch of the substrate fabric is performed. In another example, the substrate fabric is stretched simultaneously with respect to the first and second axes. In this step, the substrate fabric can be biaxially stretched such that the dimensions of the substrate fabric (e.g., in the machine and cross directions) increase by about 30% to about 100%, including about 50%, about 70%, about 90%, or another percentage, compared to the dimensions of the substrate fabric in the relaxed state. In another embodiment, the substrate fabric can be biaxially stretched such that the dimensions of the substrate fabric (e.g., in the machine and cross directions) increase by about 1% to about 30%, including about 5%, about 10%, about 15%, about 20%, about 25%, or another percentage, compared to the dimensions of the substrate fabric in the relaxed state.

Figure 15:
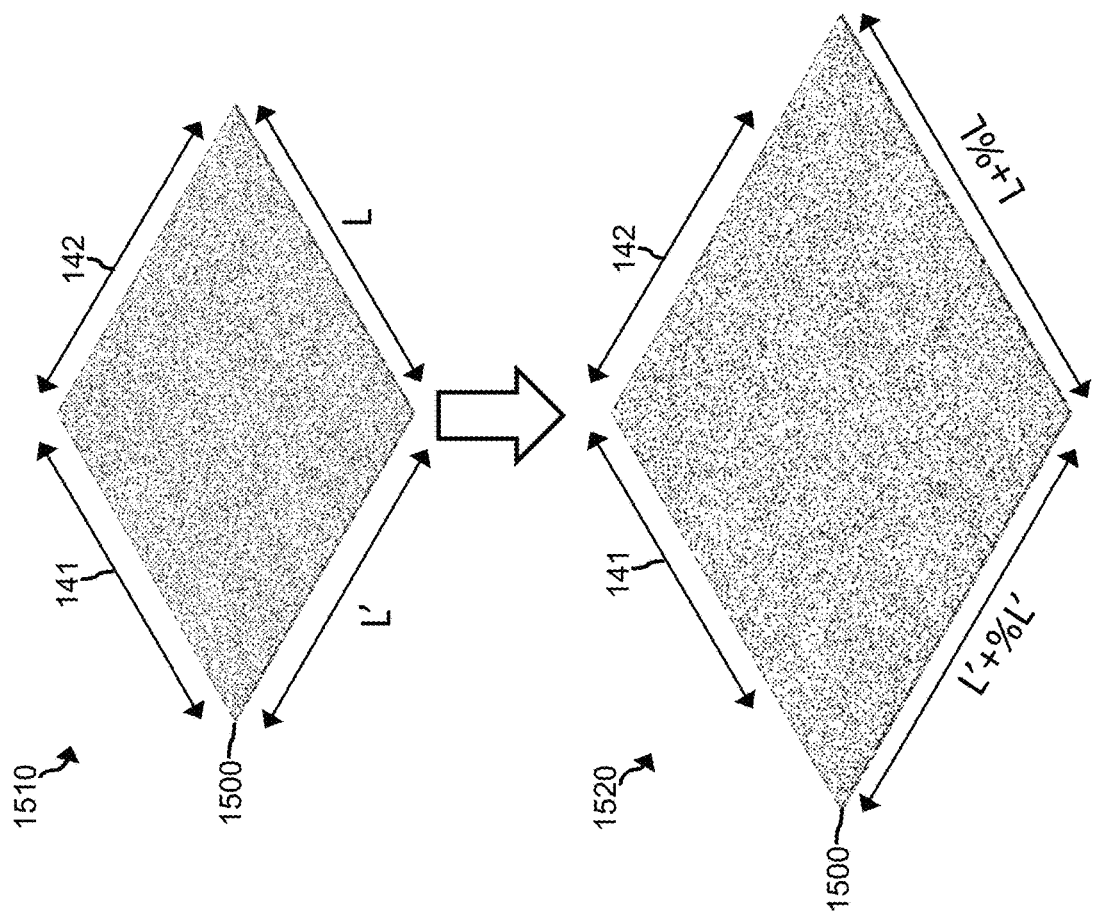
FIG. 15 is a perspective view of a substrate fabric that is stretched from a relaxed state to a biaxially-stretched state.

FIG. 15 is a perspective view of a substrate fabric 1500 that is stretched from a relaxed state 1510 to a biaxially-stretched state 1520. The dimensions of the substrate fabric 1500 are L' and L in the machine and cross directions 141, 142, respectively, when the substrate fabric 1500 is in the relaxed state 1510. The dimensions of the substrate fabric 1500 are L and L' in the machine and cross directions 141, 142, respectively, when the substrate fabric 1500 is in the relaxed state 1510. The dimensions of the substrate fabric 1500 are L+% L and L'+% L' in the machine and cross directions 141, 142, respectively, when the substrate fabric 1500 is in the biaxially-stretched state 1520. The terms % L and % L' indicate the percentage increase of the respective dimensions when the substrate fabric 1500 is in the biaxially-stretched state 1520 compared to when the substrate fabric 1500 is in the relaxed state 1510. The substrate fabric 1500 can be the same as substrate fabric 100.

In step 1402, a plurality of individual bond points are formed between the substrate fabric and a barrier film to form a biaxially stretchable laminated fabric composite material. The bond points are formed while the substrate fabric is in the biaxially-stretched state and the barrier film is in a flattened or relaxed state. The barrier film can be the same as barrier film 110. The individual bond points can be formed using adhesive dots and/or by direct bonding (e.g., bonding by applying heat, RF energy, and/or ultrasound energy).

Figure 16:
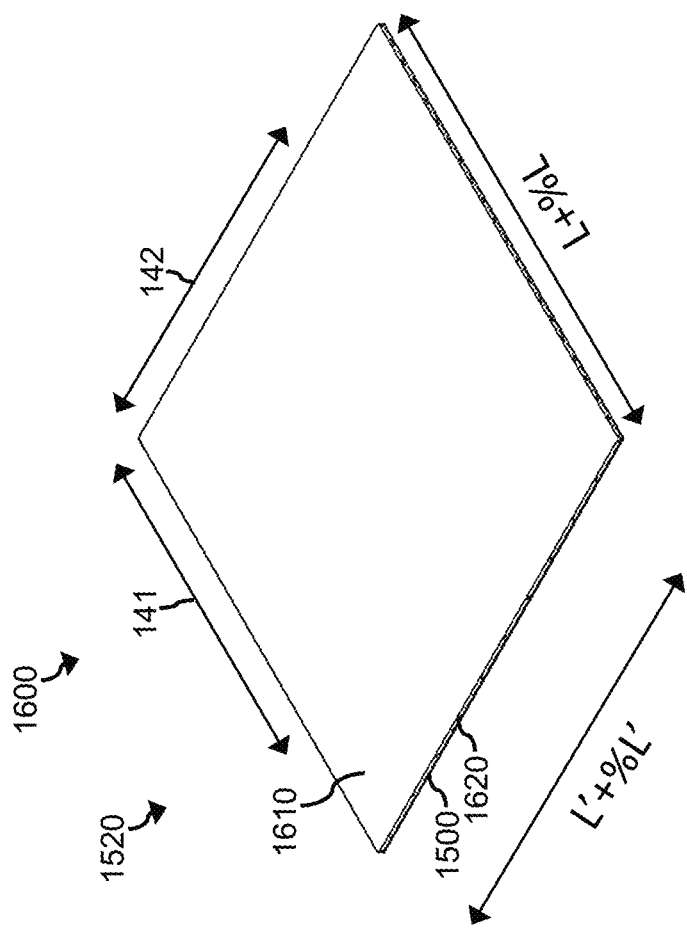
FIG. 16 is a perspective view of a biaxially stretchable laminated fabric composite material in which the substrate fabric is selectively attached to a barrier film at a plurality of individual bond points while the substrate fabric is in the biaxially-stretched state.

FIG. 16 is a perspective view of a biaxially stretchable laminated fabric composite material 1600 in which the substrate fabric 1500 is selectively attached to a barrier film 1610 at a plurality of individual bond points 1620 while the substrate fabric 1500 is in the biaxially-stretched state 1520. The barrier film 1610 and/or the bond points 1620 can be the same as barrier film 110 and the bond points 120, respectively.

In step 1403, if additional layers are to be attached to the biaxially stretchable laminated fabric composite material, the flow chart returns to step 1401. If the additional layer includes another substrate fabric, the second substrate fabric is biaxially stretched in step 1401 and then selectively attached to the barrier film layer in step 1402 at individual bond points while the first and second substrate fabrics are in the biaxially-stretched state and while the barrier film is in the flattened or relaxed state. If the additional layer includes another barrier film layer, the biaxial stretch of the existing substrate fabric is maintained in step 1401 while the second barrier film is selectively attached to the substrate fabric at individual bond points in step 1402 while the first and second barrier films are in the flattened or relaxed state. Steps 1401-1403 repeat until all layers (e.g., substrate fabric layers and barrier film layers) are selectively attached to one another at individual bond points in an alternating configuration of substrate and barrier film layers (e.g., as discussed above).

When all layers are selectively attached to one another at individual bond points, the flow chart proceeds to step 1404 where the substrate fabric(s) are biaxially relaxed to transition the biaxially stretchable laminated fabric composite material to a relaxed state. The substrate fabric(s) can be relaxed with respect to the machine and cross directions simultaneously or sequentially. When the laminated fabric composite material includes two or more substrate fabrics, all substrate fabrics are preferably relaxed simultaneously. All substrate fabrics can be relaxed together in the machine and cross directions simultaneously or sequentially.

As the substrate fabric(s) are biaxially relaxed, in step 1405 the barrier film(s) transition from a flat state to a crumpled/folded state in which random three-dimensional folds or crumples are formed in the barrier film(s) between the individual bond points. This allows the composite laminate material to elongate in all directions either individually, or simultaneously, when the substrate fabric(s) are stretched during use, as discussed above, which improves the overall comfort and flexibility of the composite material. In some embodiments, the barrier film(s) can biaxially stretch within an elastic region to further increase the range of biaxial stretching of the composite material.

Figure 17:
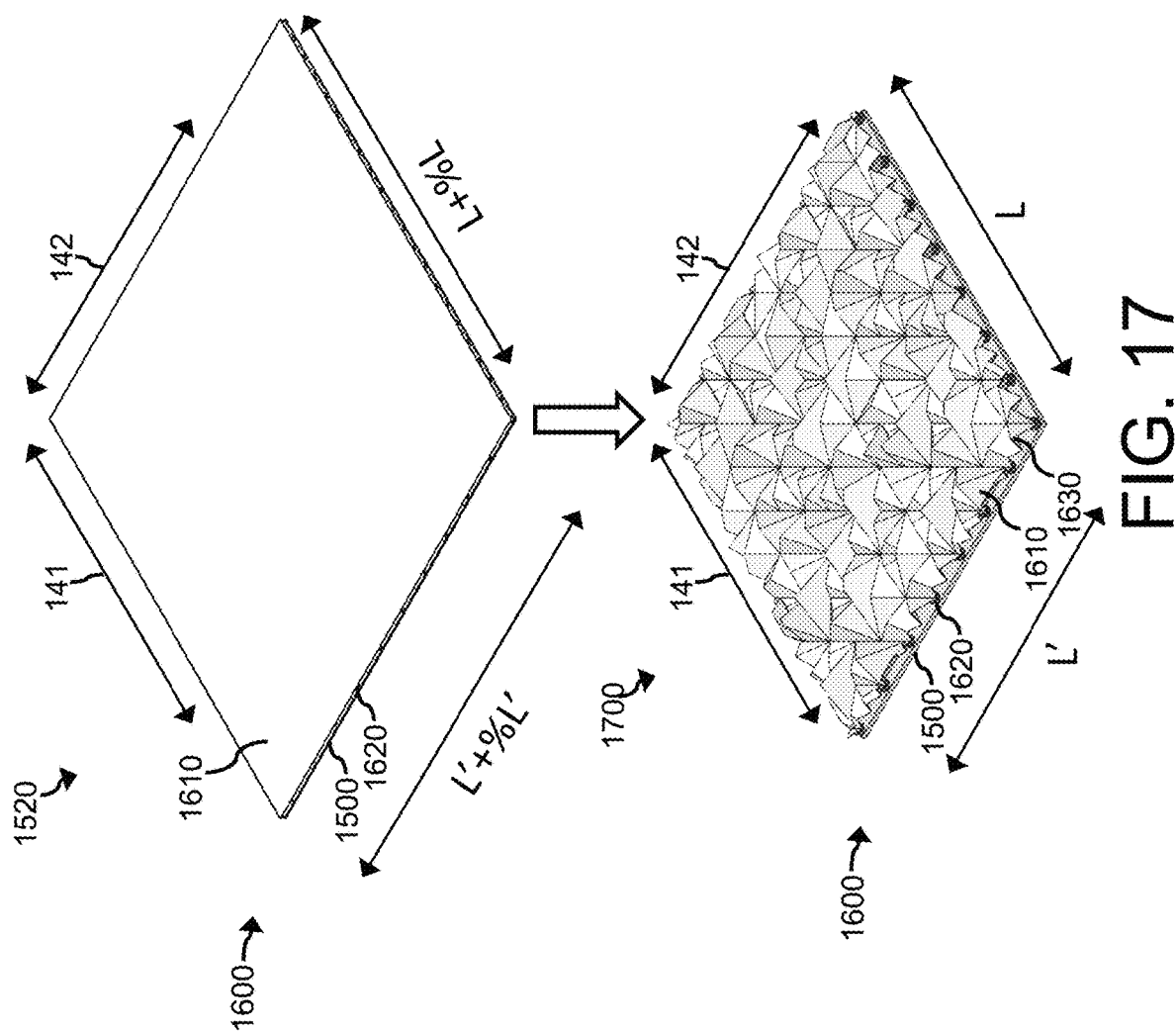
FIG. 17 is a perspective view of the biaxially stretchable laminated fabric composite material illustrated in FIG. 16 transitioning from the biaxially-stretched state to a relaxed state.

FIG. 17 is a perspective view of the biaxially stretchable laminated fabric composite material 1600 transitioning from the biaxially-stretched state 1520 to a relaxed state 1700 where random three-dimensional folds 1630 are formed in the barrier film 1610 between bond points 1620. For illustration purposes only, the composite material 1600 is illustrated as having only one substrate fabric 1500 and only one barrier film 1610. In the relaxed state, the composite material 1600 has the same or about the same dimensions, as measured in the machine and cross directions 141, 142, as the substrate fabric 1500 in the relaxed state 1510. The random folds 1630 can be the same as random folds 130.

Figure 18:
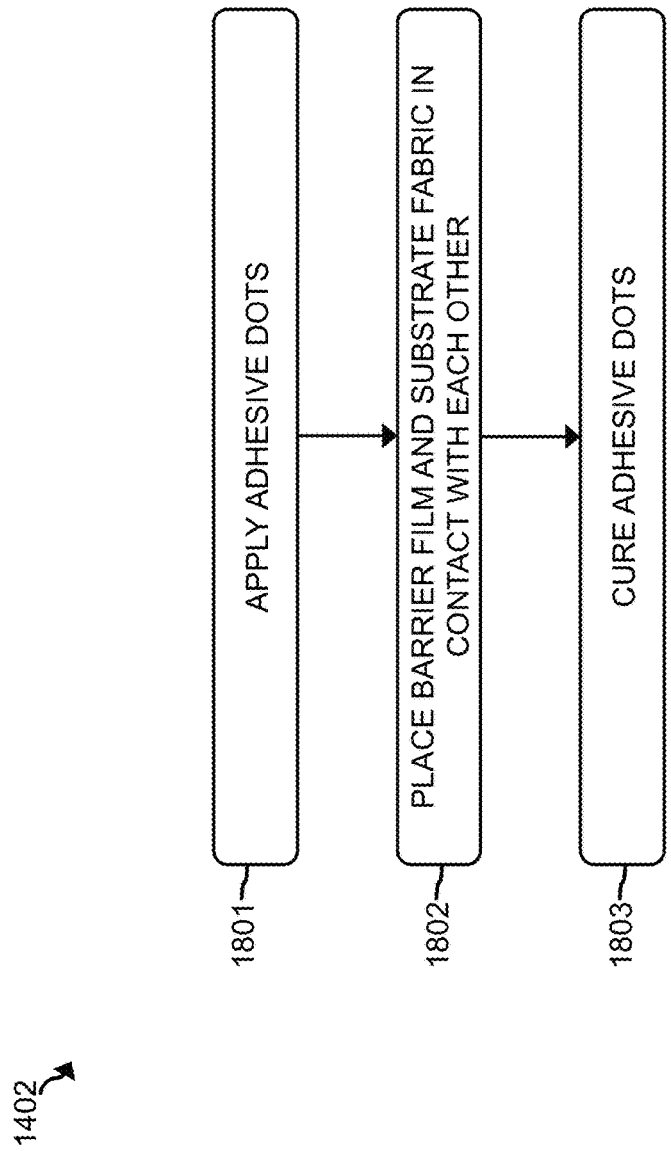
FIG. 18 is a flow chart of the step of forming individual bond points between the substrate fabric and the barrier film according to an embodiment.

FIG. 18 is a flow chart of the step 1402 of forming individual bond points between the substrate fabric and the barrier film according to an embodiment.

Figure 19:
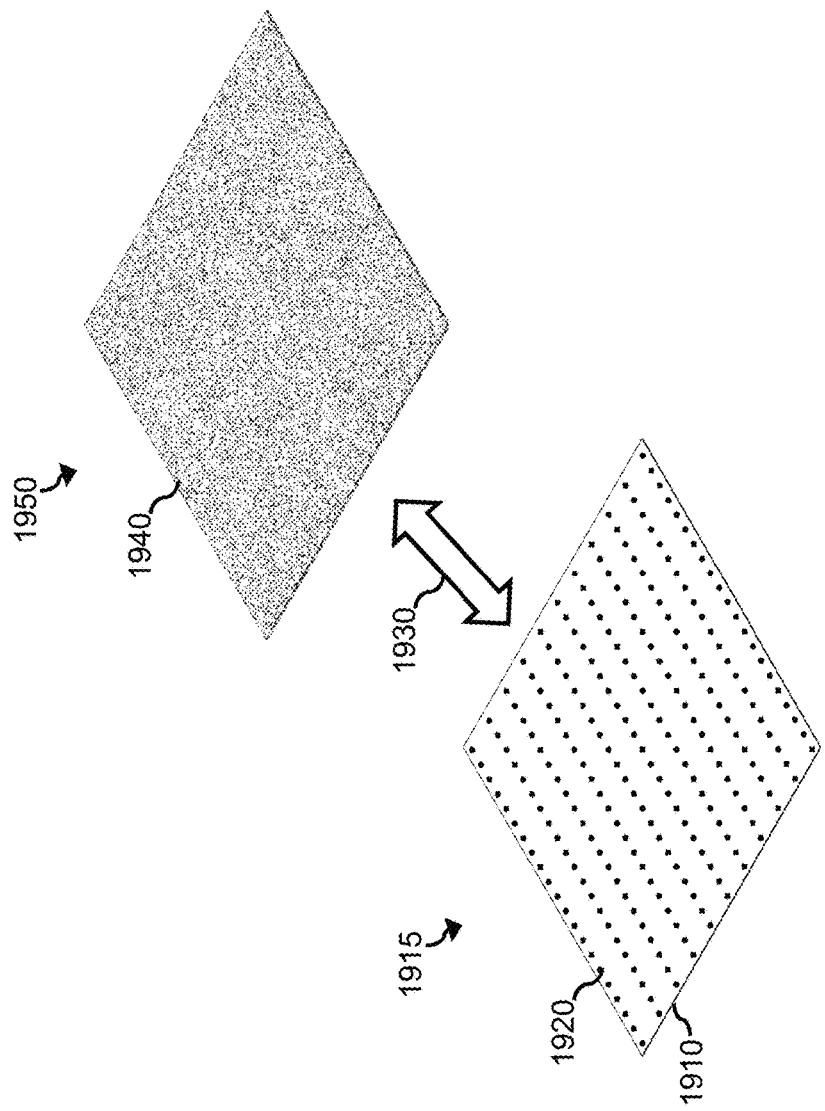
FIG. 19 illustrates an example of attaching a barrier film and a substrate fabric with adhesive dots according to an embodiment.

In step 1801, adhesive dots are applied to the substrate fabric and/or to the barrier film while the substrate fabric is in the biaxially-stretched state and the barrier film is in a flattened or relaxed state. An example of adhesive dots 1920 applied to a barrier film 1910 is illustrated in FIG. 19. The adhesive dots 1920 are applied in a regular pattern (e.g., in columns and rows). In other embodiments, the adhesive dots can be applied in a different pattern or irregularly. The barrier film 1910 is in a relaxed or flattened state 1915. The barrier film 1910 can be the same as the barrier film 110.

The adhesive dots can be applied using a gravure roll, rotary screen printing, jetting guns, screen printing, and/or another application process. In an embodiment, the adhesive dots are applied only to the substrate fabric. In another embodiment, the adhesive dots are applied only to the barrier film. In yet another embodiment, the adhesive dots are applied to both the substrate fabric and to the barrier film. The adhesive dots are spaced apart such that the straight-line distance between neighboring/adjacent adhesive dots is preferably at least large enough that neighboring/adjacent dots do not touch each other and remain separated and independent when the composite material is in the relaxed state. The straight-line distance between neighboring/adjacent adhesive dots can be about 0.1 inches to about 2 inches, including about 0.25 inches, about 0.5 inches, about 0.75 inches, about 1 inch, about 1.25 inches, about 1.5 inches, about 1.75 inches, and any value or range between any two of the foregoing distances. The adhesive dots can form a regular or irregular pattern, for example as discussed above with respect to FIGS. 5 and 6.

The adhesive dots can be applied to one or both sides of the barrier film and/or of the substrate fabric to selectively adhere multiple barrier film(s) and/or multiple substrate fabric(s) in an alternating arrangement. The adhesive dots can be aligned with respect to each other, for example as discussed above.

In step 1802, the barrier film and the substrate fabric are moved together such that the adhesive dots physically contact both the barrier film and the substrate fabric. When the substrate dots are on the barrier film and on the substrate fabric, the substrate dots can be aligned (e.g., optically) before contact is made. The substrate fabric remains in the biaxially-stretched state and the barrier film remains in the relaxed/flattened state in step 1802. FIG. 19 illustrates an example of moving together 1930 the barrier film 1910 and a substrate fabric 1940 to physically contact the adhesive dots 1920 to both the barrier film 1910 and substrate fabric 1940. The substrate fabric is in a biaxially-stretched state 1950. The substrate fabric 1940 can be the same as the substrate fabric 100.

In step 1803, the adhesive dots are cured while the adhesive dots continue to physically contact both the barrier film and the substrate fabric. The adhesive dots can be cured by heating them, adding moisture to them, exposing them to UV light, applying pressure to them, cooling them (or allowing them to cool), and/or or adding a hardener. The barrier film and the substrate fabric can optionally be held together by applying pressure, a vacuum, and/or another means to improve/maintain the physical contact between the barrier film, the substrate fabric, and the adhesive dots. The substrate fabric remains in the biaxially-stretched state and the barrier film remains in the relaxed/flattened state in step 1803.

Figure 20:
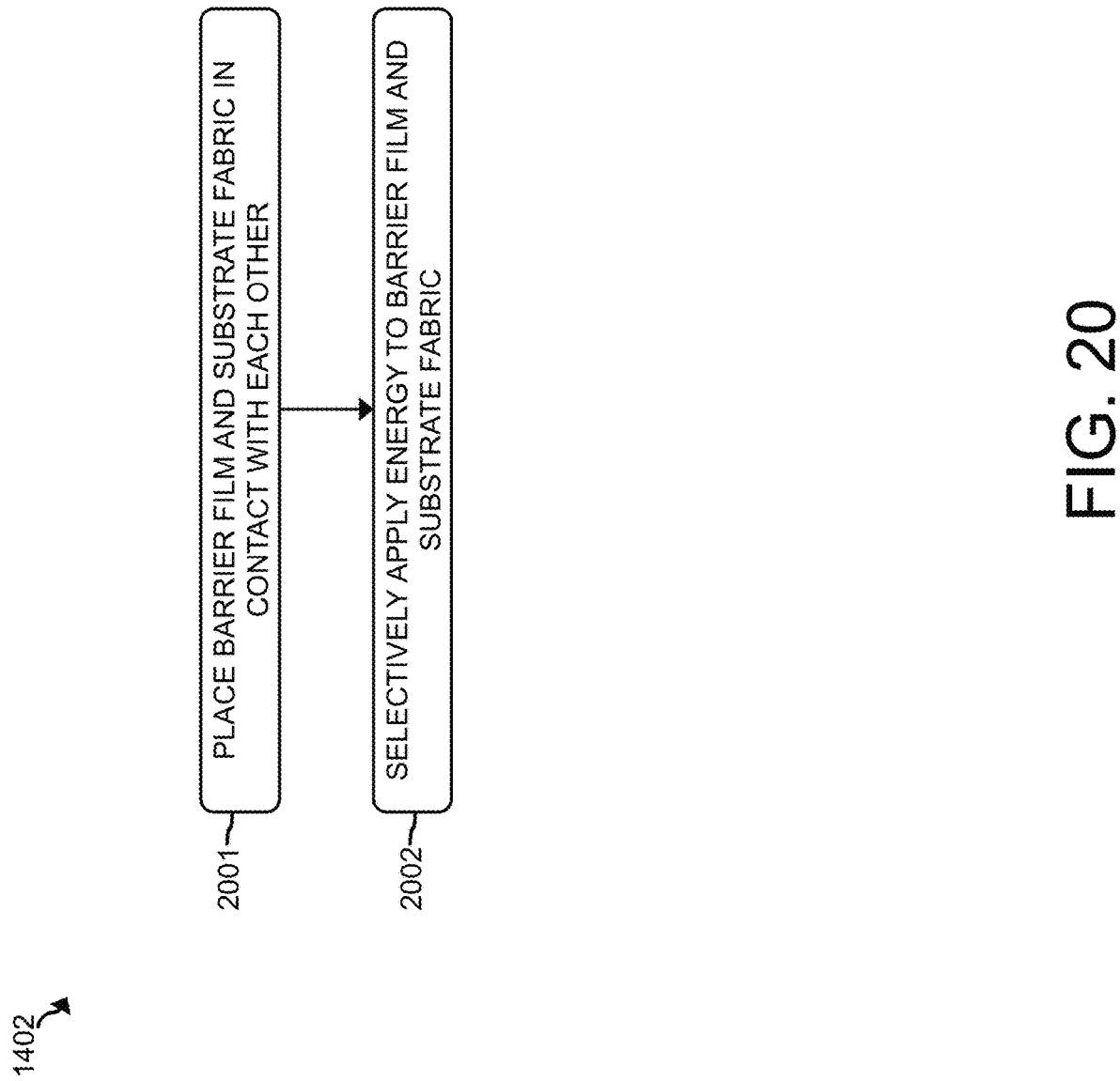
FIG. 20 is a flow chart of the step of forming individual bond points between the substrate fabric and the barrier film according to another embodiment.

FIG. 20 is a flow chart of the step 1402 of forming individual bond points between the substrate fabric and the barrier film according to another embodiment.

In step 2001, the barrier film and the substrate fabric are moved together such that the barrier film and the substrate fabric are in physical contact with each other. The substrate fabric is in the biaxially-stretched state and the barrier film is in a flattened or relaxed state during step 2001.

In step 2002, energy is selectively applied to the barrier film and the substrate fabric, while the barrier film and the substrate fabric are in physical contact with each other and while the substrate fabric is in the biaxially-stretched state and the barrier film is in a flattened or relaxed state, to form individual bond points. The energy can include or consist of thermal energy, ultrasonic energy, and/or RF energy.

Figure 21:
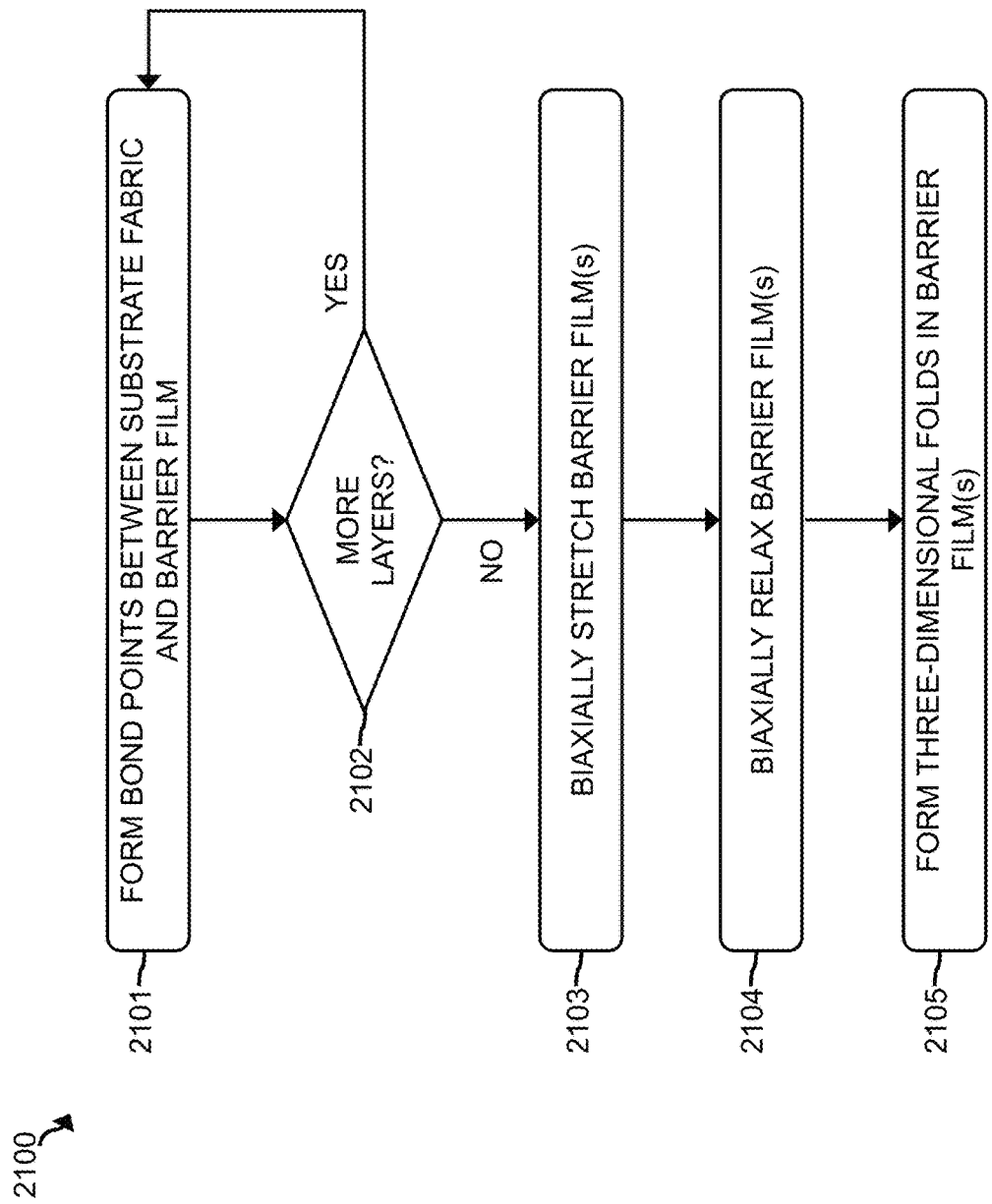
FIG. 21 is a flow chart of a method for manufacturing a biaxially stretchable laminated fabric composite material according to another embodiment.

FIG. 21 is a flow chart of a method 2100 for manufacturing a biaxially stretchable laminated fabric composite material according to another embodiment. Method 2100 is preferred especially when the barrier film has an inherent reversible stretch (e.g., in an elastic region), but can also be used when the barrier film has little to no inherent stretch. Method 2100 can be used to make composite material 10, 70, 90, 1000, 1100, or 1300.

In step 2101, a plurality of individual bond points are formed between a substrate fabric and a barrier film while both the substrate fabric and the barrier film are in the relaxed state to form a composite material. The barrier film can be the same as barrier film 110. The individual bond points can be the same as individual bond points 120. The individual bond points can be formed using adhesive dots and/or by direct bonding (e.g., bonding by applying heat, RF energy, and/or ultrasound energy).

The substrate fabric can be the same as the substrate fabric 100.

Step 2101 is the same as step 1402 except that in step 2101 the substrate fabric is in the relaxed state while in step 1402 the substrate fabric is in the biaxially-stretched state. The barrier film is in the relaxed or flattened state in steps 1402 and 2101. When the bond points are formed with adhesive dots, step 2101 can be performed according to steps 1801-1803 except that the barrier film is in the relaxed state during steps 1801-1803. When the bond points are formed by selectively applying energy, step 2101 can be performed according to steps 2001-2002 except that the barrier film is in the relaxed state during steps 2001-2002.

Figure 22:
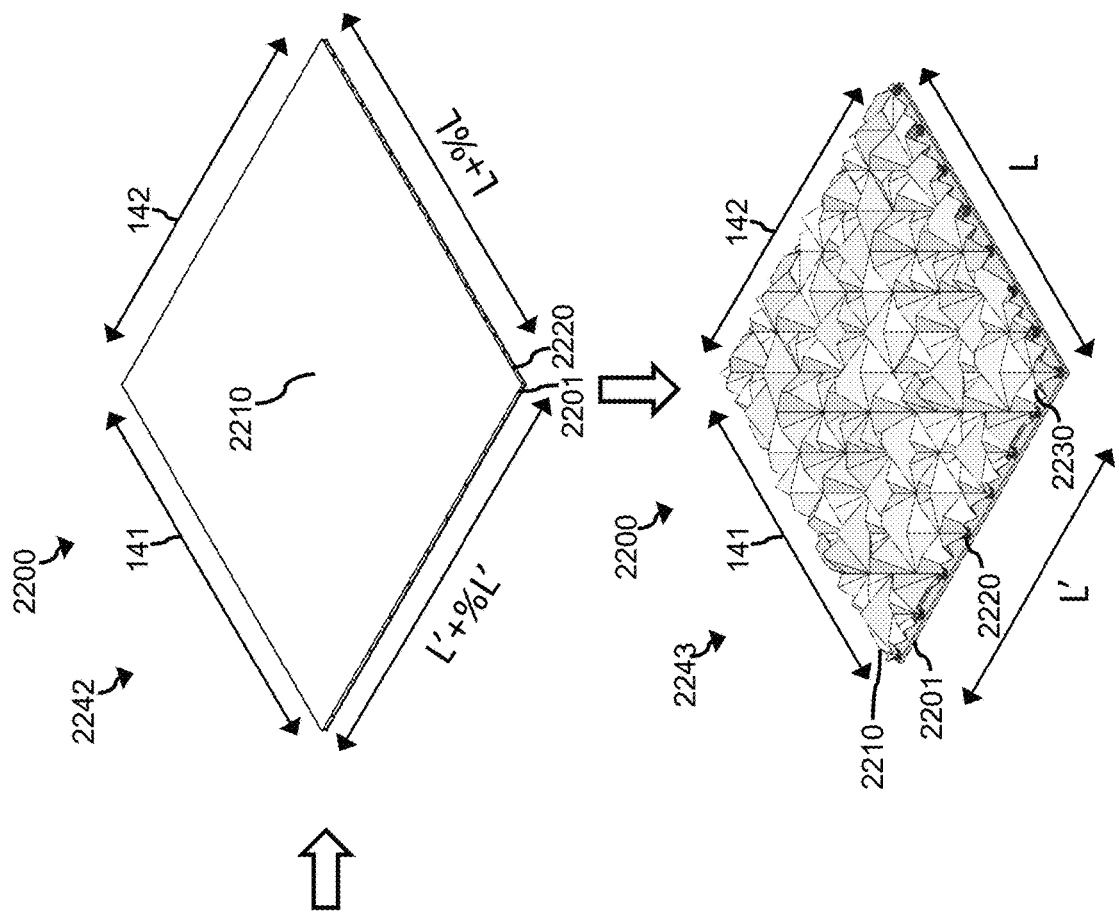
FIG. 22 illustrates an example of a biaxially stretchable laminated fabric composite material where the barrier film transitions between a flat state, a strained state, and a randomly folded state.

An example of a composite material 2200 formed in step 2101 is illustrated in FIG. 22. The composite material 2200 includes a substrate fabric layer 2201, a barrier film layer 2210, and bond points 2220 that selectively attach the substrate fabric layer 2201 and the barrier film layer 2210. For illustration purposes only, the composite material 2200 is illustrated as having only one substrate fabric layer 2201 and only one barrier film layer 2210. The composite material 2200 is in a relaxed state and the barrier film layer 2210 is in a flat state 2241 as a result of step 2101. The substrate fabric layer 2201, the barrier film layer 2210, and/or the bond points 2220 can be the same as the substrate fabric 100, the barrier film 110, and the bond points 120, respectively.

In step 2102, if additional layers are to be attached to the composite material, the flow chart returns to step 2101. If the additional layer includes another substrate fabric, the second substrate fabric is selectively attached to the barrier film layer in step 2101 at individual bond points while the first and second substrate fabrics and the barrier film are in the relaxed state. If the additional layer includes another barrier film layer, the second barrier film is selectively attached to the substrate fabric at individual bond points in step 1001 while the substrate fabric and the first and second barrier films are in the relaxed state. Steps 2101 and 2102 repeat until all layers (e.g., substrate fabric layers and barrier film layers) are selectively attached to one another at individual bond points in an alternating configuration of substrate and barrier film layers (e.g., as discussed above).

When all layers are selectively attached to one another at individual bond points, the flow chart proceeds to step 2103 where the barrier film(s) is/are biaxially stretched to cause a strain on the barrier film(s) that is higher than the yield strain of the barrier film(s). The strain causes a permanent deformation in the biaxial direction of the strain barrier film(s) that biaxially increases the dimensions of the barrier film(s) with respect to the machine and cross directions. The strain can also cause the barrier film(s) to be partially reversibly stretched when the barrier film(s) have an elastic region.

The barrier film(s) can be biaxially stretched by biaxially stretching the substrate fabric(s), which in turn stretches the barrier film(s) due to the bond points between the substrate fabric(s) and the barrier film(s). Alternatively, the composite material as a whole can be biaxially stretched. Alternatively, the barrier film(s) can be biaxially stretched, which in turn stretches the substrate fabric(s) due to the bond points between the substrate fabric(s) and the barrier film(s).

The substrate fabric(s), the barrier film(s), or the composite material is preferably stretched equally or approximately equally in all four directions (e.g., in opposite directions with respect to the machine direction and in opposite directions with respect to the cross direction). Approximately the same stretching can mean that the magnitude of the elongation is within plus or minus about 1 to about 10% in each direction, including about 3%, about 5%, about 7%, and about 9%, including any value or range between any two of the foregoing percentages. In one example, the substrate fabric(s), the barrier film(s), or the composite material is stretched uniaxially with respect to a first axis (e.g., parallel to the machine direction) and then, while maintaining the stretch with respect to the first axis, the respective substrate fabric(s), the barrier film(s), or the composite material is then stretched with respect to a second axis (e.g., parallel to the cross direction) that is orthogonal to the first axis, such that a biaxal (e.g., four-way) stretch of the substrate fabric(s), the barrier film(s), or the composite material, respectively, is performed. In another example, the substrate fabric(s), the barrier film(s), or the composite material is stretched simultaneously with respect to the first and second axes.

The substrate fabric can be biaxially stretched such that the dimensions of the substrate fabric(s) or the composite material (e.g., in the machine and cross directions) increase by about 30% to about 100%, including about 50%, about 70%, about 90%, or another percentage, compared to the dimensions of the substrate fabric(s) or the composite material, respectively in the relaxed state. When the composite material includes two or more substrate fabric layers, the substrate fabric layers are preferably biaxially stretched simultaneously.

As a result of step 2103, the barrier film(s) are placed in a biaxially-strained state and the substrate fabric(s) and the composite material are placed in a biaxially-stretched state. FIG. 22 illustrates the barrier film 2210 transitioning from the flat state 2241 to a strained state 2242 as the composite material 2200 and the substrate fabric 2201 transitions from the relaxed state to a biaxially-strained state.

In step 2104, the barrier film(s) is/are biaxially relaxed. The barrier film(s) can be relaxed by releasing the biaxal stretching force on the substrate fabric(s), the barrier film(s), or the composite material. The biaxal stretching force can be released with respect to the machine and cross directions simultaneously or sequentially. When the laminated fabric composite material includes two or more substrate fabrics and the two or more substrate fabrics are biaxially stretched in step 2103, the biaxal stretching force on all substrate fabrics is preferably released simultaneously.

As the barrier film(s) is/are biaxially relaxed, in step 2105 the barrier film(s) transition to a crumpled/folded state in which random three-dimensional folds or crumples are formed in the barrier film(s) between the individual bond points. This allows the composite laminate material to elongate when the substrate fabric(s) are stretched during use, as discussed above, which improves the overall comfort and flexibility of the composite material. In some embodiments, the barrier film(s) can biaxially stretch within an elastic region to further increase the range of biaxial stretching of the composite material.

FIG. 22 illustrates the barrier film 2210 transitioning from the strained state 2242 to a randomly folded state 2243 as the composite material 2200 and the substrate fabric 2201 transitions from the biaxially-strained state to a relaxed state. In the randomly folded state, the barrier film 2210 includes random three-dimensional folds or crumples 2230 between the individual bond points 2220. The random folds 2230 can be the same as the random folds 130. The composite material 2200 has the same or about the same dimensions, as measured in the machine and cross directions 141, 142, when the barrier film 2210 is in the flat state 2141 compared to when the barrier film 2210 is in the randomly folded state 2243.

Figure 23:
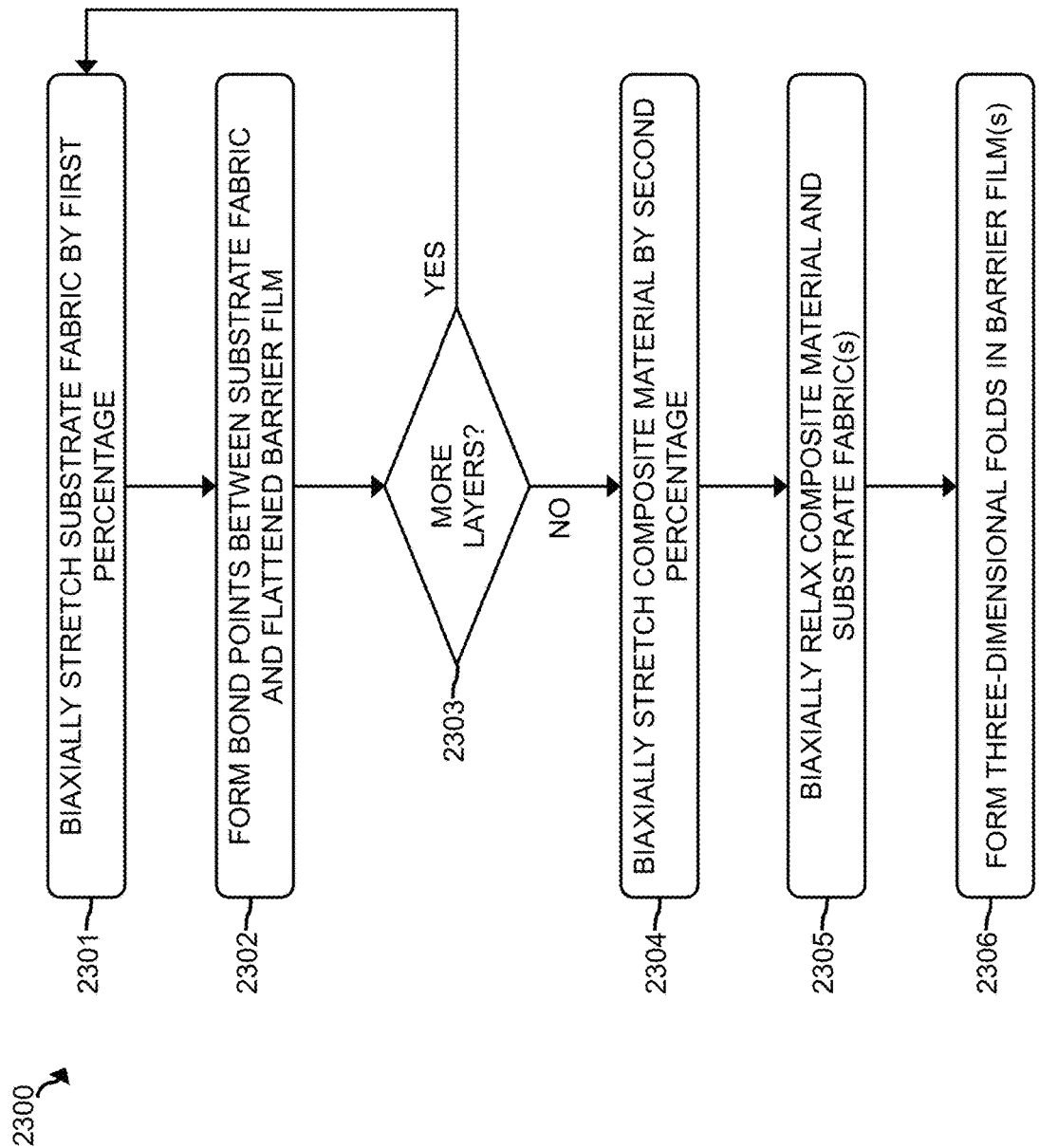
FIG. 23 is a flow chart of a method for manufacturing a biaxially stretchable laminated fabric composite material according to another embodiment.

FIG. 23 is a flow chart of a method 2300 for manufacturing a biaxially stretchable laminated fabric composite material according to another embodiment. Method 2300 can be used to make composite material 10, 70, 90, 1000, 1100, 1300, 1600, or 2200.

In step 2301, a substrate fabric is biaxially stretched by a first percentage. The substrate fabric can be the same as substrate fabric 100. Step 2301 can the same as step 1401 except that in step 2301 the substrate fabric is biaxially stretched by a first percentage that is less than or equal to the extent of elongation desired or required in the final laminated fabric composite material. The substrate fabric is in a first biaxially-stretched state as a result of step 2301.

In step 2302, a plurality of individual bond points are formed between the substrate fabric and a barrier film to form a biaxially stretchable laminated fabric composite material. The bond points are formed while the substrate fabric is in the first biaxially-stretched state and the barrier film is in a flattened or relaxed state. The barrier film can be the same as barrier film 110. The bond points can be the same as bond points 120. Step 2302 is the same as step 1402.

Figure 24:
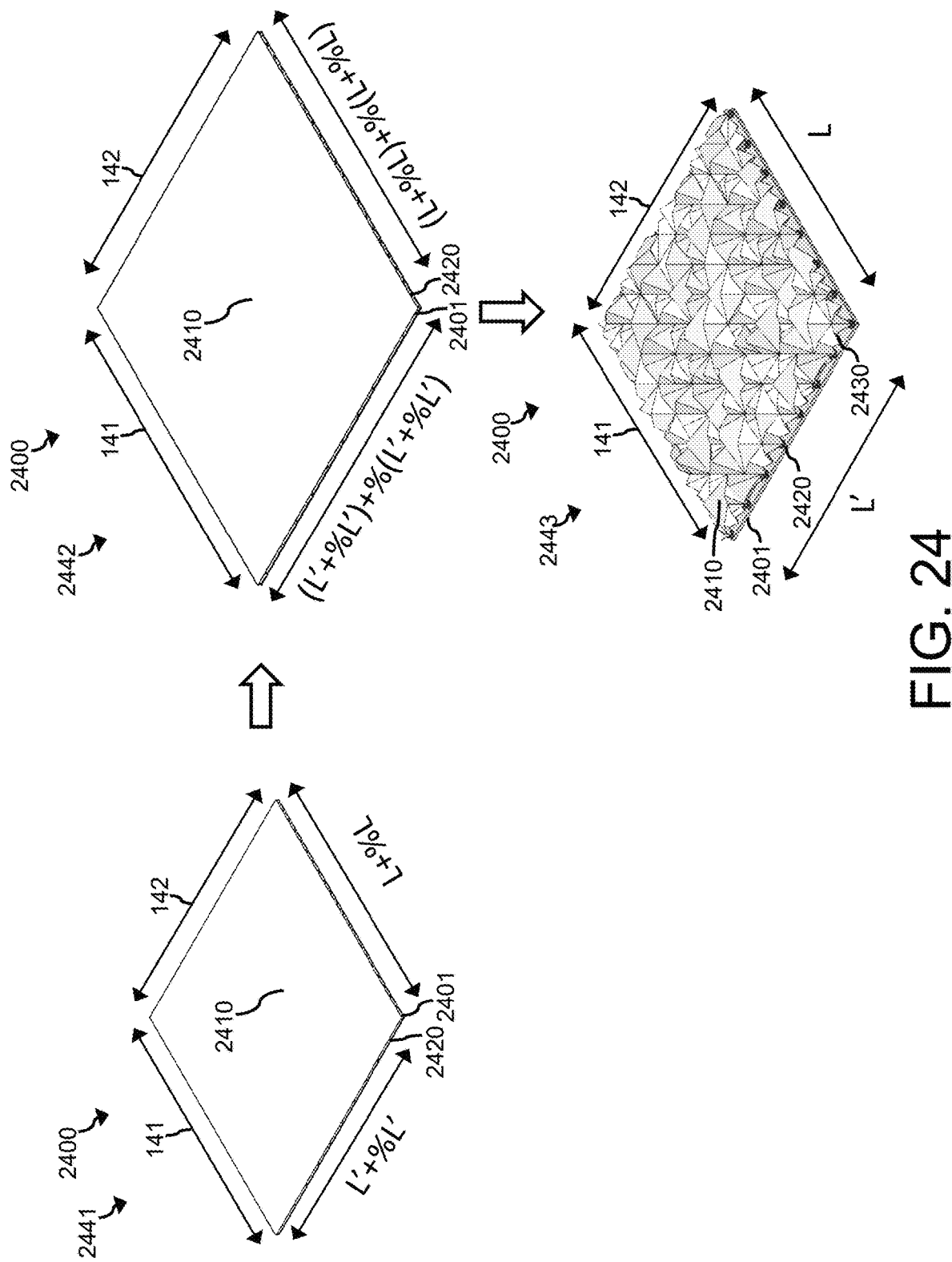
FIG. 24 illustrates an example of a composite material where the fabric substrate transitions between a first biaxially-stretched state, a second biaxially-stretched state, and a relaxed state.

An example of a composite material 2400 formed in step 2302 is illustrated in FIG. 24. The composite material 2400 includes a substrate fabric layer 2401, a barrier film layer 2410, and individual bond points 2420 that selectively attach the substrate fabric layer 2401 and the barrier film layer 2410. For illustration purposes only, the composite material 2400 is illustrated as having only one substrate fabric layer 2401 and only one barrier film layer 2410. The substrate fabric layer, the barrier film layer 2410, and/or the bond points 2420 can be the same as the substrate fabric 100, the barrier film 110, and the bond points 120, respectively.

The substrate fabric layer 2401 is in a first biaxially-stretched state 2441 and the barrier film 2410 is in a flattened state as a result of step 2302. The dimensions of the substrate fabric 2401 are L+% L and L'+% L' in the machine and cross directions 141, 142, respectively, when the substrate fabric 2401 is in the first biaxially-stretched state 2441. The terms % L and % L' indicate the percentage increase of the respective dimensions when the substrate fabric 2401 is in the first biaxially-stretched state 2441 compared to when the substrate fabric 2401 is in a relaxed state.

In step 2303, if additional layers are to be attached to the biaxially stretchable laminated fabric composite material, the flow chart returns to step 2301. If the additional layer includes another substrate fabric, the second substrate fabric is biaxially stretched by a first percentage in step 2301 and then selectively attached to the barrier film layer in step 2302 at individual bond points while the first and second substrate fabrics are in the first biaxially-stretched state and while the barrier film is in the flattened or relaxed state. If the additional layer includes another barrier film layer, the biaxial stretch of the existing substrate fabric is maintained in step 2301 while the second barrier film is selectively attached to the substrate fabric at individual bond points in step 2302 while the first and second barrier films are in the flattened or relaxed state. Steps 2301-2303 repeat until all layers (e.g., substrate fabric layers and barrier film layers) are selectively attached to one another at individual bond points in an alternating configuration of substrate and barrier film layers (e.g., as discussed above).

When all layers are selectively attached to one another at individual bond points, the flow chart proceeds to step 2304 where the biaxially stretchable laminated fabric composite material is biaxially stretched by a second percentage. Both the substrate fabric(s) and the barrier film(s) are biaxially stretched and elongated to the same extent in this step. The second percentage of biaxial stretching causes the substrate fabric(s) to be stretched to greater than or equal to the extent of elongation desired or required in the final laminated fabric composite material. The second percentage of biaxial stretching can cause a strain on the barrier film(s) that is greater than its/their yield strain, which can result in permanent deformation and biaxial elongation of the barrier film(s) (e.g., as discussed above with respect to step 2103).

Alternatively, the substrate fabric(s) can be biaxially stretched by a second percentage in step 2304 instead of biaxially stretching the biaxially stretchable laminated fabric composite material. Biaxially stretching the substrate fabric(s) causes the barrier film(s) to biaxially stretch due to the individual bond points between the substrate fabric(s) and the barrier film(s). Alternatively, the barrier film(s) can be biaxially stretched by a second percentage in step 2304 instead of biaxially stretching the biaxially stretchable laminated fabric composite material. Biaxially stretching the barrier film(s) causes the substrate fabric(s) to biaxially stretch due to the individual bond points between the substrate fabric(s) and the barrier film(s).

FIG. 24 illustrates the composite material 2400 transitioning to a biaxially-stretched state as the substrate fabric 2401 transitions from the first biaxially-stretched state 2441 to a second biaxially-stretched state 2442 and the barrier film 2410 transitions to a reversible biaxially-stretched state or a biaxially-strained state, depending on the strain applied to the barrier film 2410. The dimensions of the substrate fabric 2401 are (L+% L)+% (L+% L) and (L'+% L')+% (L'+% L') in the machine and cross directions 141, 142, respectively, when the substrate fabric 2401 is in the second biaxially-stretched state 2442. The terms % (L+% L) and % (L'+% L') indicate the percentage increase of the respective dimensions when the substrate fabric 2401 is in the second biaxially-stretched state 2442 compared to when the substrate fabric 2401 is in the first biaxially-stretched state 2441.

In step 2305, the biaxially stretchable laminated fabric composite material and the substrate fabric(s) are biaxially relaxed. The biaxially stretchable laminated fabric composite material and the substrate fabric(s) can be relaxed simultaneously or sequentially. The biaxially stretchable laminated fabric composite material and/or the substrate fabric(s) can be relaxed with respect to the machine and cross directions simultaneously or sequentially. When the laminated fabric composite material includes two or more substrate fabrics, all substrate fabrics are preferably relaxed simultaneously. Additionally or alternatively, the barrier film(s) can be biaxially relaxed in step 2305 (e.g., when the barrier film(s) are biaxially stretched in step 2304 or step 2301).

As the biaxially stretchable laminated fabric composite material and the substrate fabric(s) is/are biaxially relaxed, in step 2306 the barrier film(s) transition to a crumpled/folded state in which random three-dimensional folds or crumples are formed in the barrier film(s) between the individual bond points. The random folds/crumples can be smaller when the barrier film(s) are stretched beyond its/their yield strain compared to when the barrier film(s) are not stretched beyond its/their yield strain in step 2304.

The random folds/crumples allows the composite laminate material to elongate when the substrate fabric(s) are stretched during use, as discussed above, which improves the overall comfort and flexibility of the composite material. In some embodiments, the barrier film(s) can biaxially stretch within an elastic region to further increase the range of biaxial stretching of the composite material.

FIG. 24 illustrates the composite material 2400 transitioning to a relaxed state as the substrate fabric 2401 transitions from the second biaxially-stretched state 2442 to a relaxed state 2443 and the barrier film 2410 transitions to a randomly folded state. In the randomly folded state, the barrier film 2410 includes a plurality of random three-dimensional folds or crumples 2430 between bond points 2420. The random folds 2430 can be the same as random folds 130. The dimensions of the substrate fabric 2401 are L and L' in the machine and cross directions 141, 142, respectively, when the substrate fabric 2401 is in the relaxed state 2443.

Figure 25:
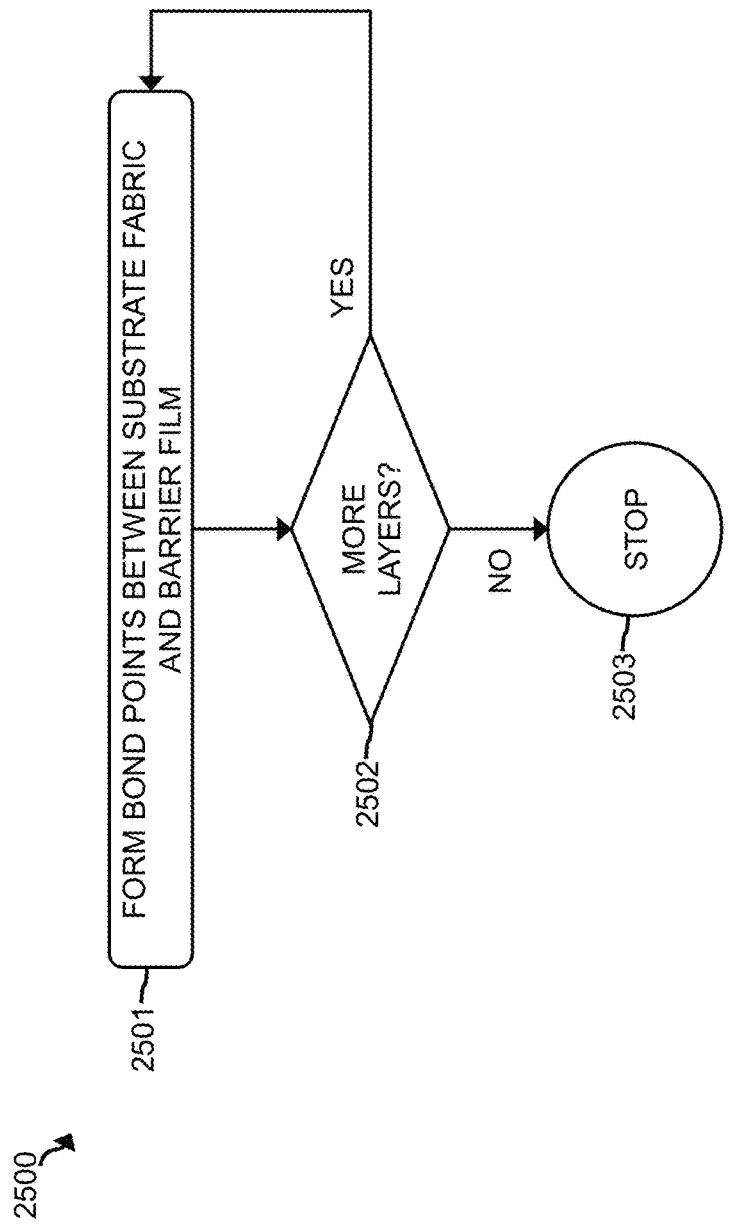
FIG. 25 is a flow chart of a method for manufacturing a biaxially stretchable laminated fabric composite material according to another embodiment.

FIG. 25 is a flow chart of a method 2500 for manufacturing a biaxially stretchable laminated fabric composite material according to another embodiment. Method 2500 is preferably used when the barrier film has an inherent reversible stretch (e.g., in an elastic region).

In step 2501, a plurality of individual bond points are formed between a substrate fabric and a barrier film while the substrate fabric is a relaxed state and the barrier film is in a relaxed or flattened state to form a composite material. Step 2501 can be the same as step 2101.

In step 2502, if additional layers are to be attached to the composite material, the flow chart returns to step 2501. If the additional layer includes another substrate fabric, the second substrate fabric is selectively attached to the barrier film layer in step 2501 at individual bond points while the first and second substrate fabrics and the barrier film are in the relaxed state. If the additional layer includes another barrier film layer, the second barrier film is selectively attached to the substrate fabric at individual bond points in step 2501 while the substrate fabric and the first and second barrier films are in the flattened or relaxed state. Steps 2501 and 2502 repeat until all layers (e.g., substrate fabric layers and barrier film layers) are selectively attached to one another at individual bond points in an alternating configuration of substrate and barrier film layers (e.g., as discussed above). Step 2502 can be the same as step 2102.

When all layers are selectively attached to one another at individual bond points, the flow chart ends at 2503.

Figure 26:
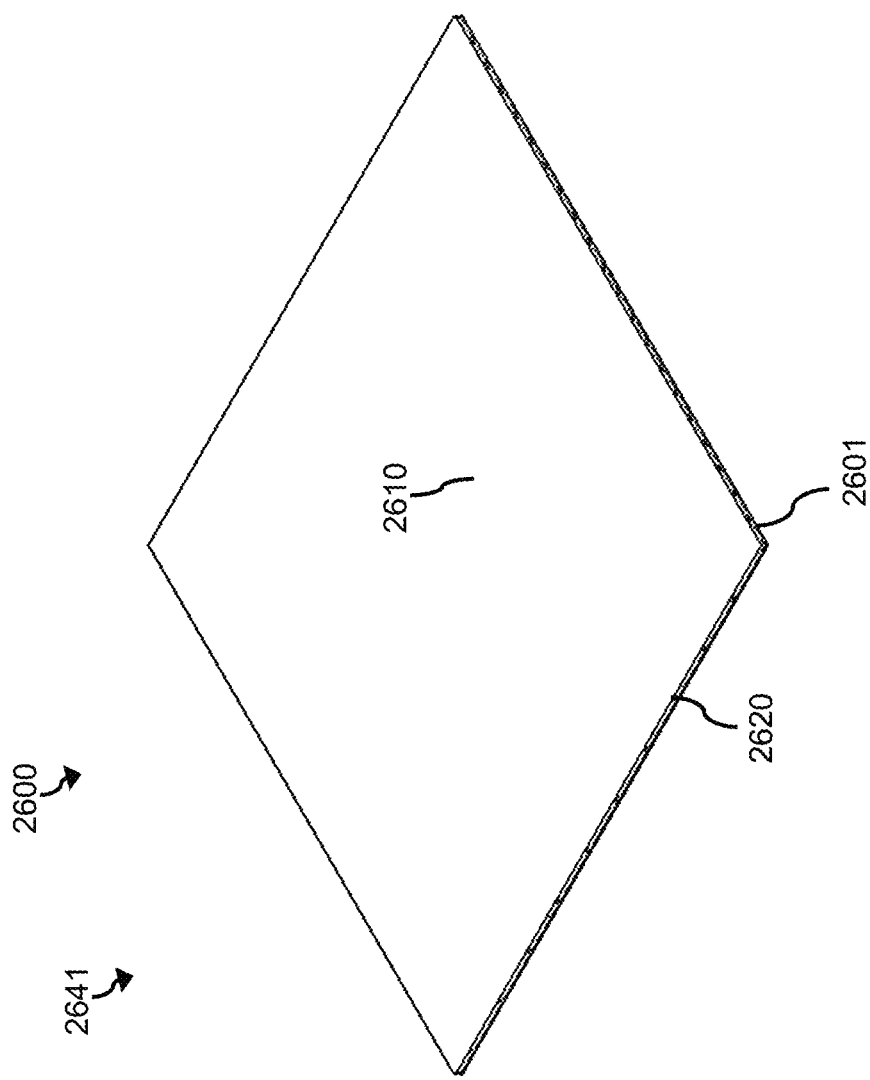
FIG. 26 illustrates an example of a composite material formed using method of FIG. 25.

An example of a composite material 2600 formed using method 2500 is illustrated in FIG. 26. The composite material 2600 includes a substrate fabric layer 2601, a barrier film layer 2610, and bond points 2620 that selectively attach the substrate fabric layer 2601 and the barrier film layer 2610. For illustration purposes only, the composite material 2600 is illustrated as having only one substrate fabric 2601 and only one barrier film layer 2610. The composite material 2600 and the substrate fabric layer 2601 are in a relaxed state and the barrier film layer 2610 is in a flat state 2641. The substrate fabric layer 2601, the barrier film layer 2610, and/or the bond points 2620 can be the same as the substrate fabric 100, the barrier film 110, and the bond points 120, respectively. The composite material 2600 can biaxially stretch within the elastic region of the barrier film layer 2610.

FIG. 27 illustrates CRBN garments 2700 according to an embodiment.

The garments 2700 are formed using one or more of the composite materials described herein. For example, the garments 2700 can be formed using composite material(s) 10, 70, 90, 1000, 1100, 1300, 1600, 2200, 2400, and/or 2600. The shape of the garments can be changed, as desired. For example, the garments 2700 can comprise a single piece or the top and bottom can be releasably connected such as with a zipper. The end of the arms of the shirt/top can be configured to receive and/or mate with the ends of gloves to form a continuous barrier layer for the user. Likewise, the bottom of the pant legs can be configured to receive and/or mate with boots or booties to form a continuous barrier layer for the user.

The invention should not be considered limited to the particular embodiments described above, but rather should be understood to cover all aspects of the invention as fairly set out in the attached claims. Various modifications, equivalent processes, as well as numerous structures to which the invention may be applicable, will be apparent to those skilled in the art to which the invention is directed upon review of this disclosure. The claims are intended to cover such modifications and equivalents.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A biaxially-stretchable barrier laminate fabric composite material comprising:
   a biaxially-stretchable substrate fabric having a relaxed state and a biaxially-stretched state, wherein dimensions of the biaxially-stretchable substrate fabric are greater in the biaxially-stretched state than in the relaxed state, the biaxially-stretchable substrate fabric having first and second surfaces, the first and second surfaces being planar in the relaxed state and in the biaxially-stretched state;
   a barrier film selectively attached to the biaxially-stretchable substrate fabric at a plurality of individual bond points, the barrier film having unbonded regions between the bond points, wherein the biaxially stretchable barrier laminate fabric is configured such that:
when the biaxially-stretchable substrate fabric is in the relaxed state, the barrier film is in a randomly folded state in which random folds are formed in the unbonded regions of the barrier film, the random folds oriented with respect to a machine direction, a cross direction, and an orthogonal direction, wherein the machine direction, the cross direction and the orthogonal direction are mutually orthogonal to one another, and
when the biaxially-stretchable substrate fabric is in the biaxially-stretched state, the barrier film is in a flattened state in which the random folds are partially or fully unfolded.

2. The material of claim 1, wherein the biaxially-stretchable substrate fabric is capable of stretching biaxially without substantially stretching the barrier film.

3. The material of claim 1, wherein the barrier film comprises:
first and second outer flexible layers; and
a central barrier layer between the first and second outer flexible layers.

4. The material of claim 3, wherein the central barrier layer comprises an ethylene vinyl alcohol polymer.

5. The material of claim 4, wherein the first and second outer flexible layers comprise a thermoplastic polyurethane.

6. The material of claim 1, wherein the bond points comprise adhesive dots.

7. The material of claim 1, wherein a straight-line distance between neighboring bond points is greater than or equal to about 0.1 inches and less than or equal to about 2 inches, the straight-line distance measured while the substrate fabric is in the biaxially-stretched state.

8. The material of claim 1, wherein the barrier film is configured to reversibly biaxially stretch within a barrier film elastic region when the biaxially-stretchable substrate fabric is in the biaxially-stretched state.

9. The material of claim 1, wherein the material is configured to reversibly biaxially stretch and relax for at least 2,000 cycles.

10. The material of claim 1, wherein the barrier film functions as a chemical barrier regardless of whether the barrier film is in the randomly folded state or the flattened state.

* * * * *